(12) United States Patent
Tseng et al.

(10) Patent No.: US 12,405,607 B2
(45) Date of Patent: Sep. 2, 2025

(54) SYSTEM AND METHOD OF CONTROLLING DRONE BASED ON PRESSURE

(71) Applicants: Hung-Ju Tseng, Taipei (TW); Dai-Yun Tsai, Taipei (TW)

(72) Inventors: Hung-Ju Tseng, Taipei (TW); Dai-Yun Tsai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 319 days.

(21) Appl. No.: 18/075,364

(22) Filed: Dec. 5, 2022

(65) Prior Publication Data

US 2024/0134370 A1 Apr. 25, 2024
US 2024/0231355 A9 Jul. 11, 2024

(30) Foreign Application Priority Data

Oct. 21, 2022 (TW) .................................. 111139954

(51) Int. Cl.
| | |
|---|---|
| *G05D 1/00* | (2024.01) |
| *B64U 10/13* | (2023.01) |
| *G05D 1/223* | (2024.01) |
| *G05D 1/224* | (2024.01) |
| *G05D 1/46* | (2024.01) |

(52) U.S. Cl.
CPC .......... *G05D 1/0016* (2013.01); *B64U 10/13* (2023.01); *G05D 1/0038* (2013.01); *G05D 1/101* (2013.01); *G05D 1/223* (2024.01); *G05D 1/224* (2024.01); *G05D 1/46* (2024.01); *B64U 2201/20* (2023.01)

(58) Field of Classification Search
CPC .... G05D 1/0016; G05D 1/0038; G05D 1/101; G05D 1/223; G05D 1/224; G05D 1/46; G05D 2101/15; G05D 1/2247; G05D 2109/254; B64U 10/13; B64U 2201/20; B64U 2101/30; B64U 10/00; B64C 39/024
See application file for complete search history.

(56) References Cited

U.S. PATENT DOCUMENTS

| | | | |
|---|---|---|---|
| 9,549,585 B2 | 1/2017 | Amos et al. | |
| 10,220,310 B1 | 3/2019 | Froy et al. | |

(Continued)

FOREIGN PATENT DOCUMENTS

| | | |
|---|---|---|
| CN | 205139708 | 4/2016 |
| CN | 105629767 | 6/2016 |

(Continued)

OTHER PUBLICATIONS

"Office Action of Taiwan Counterpart Application", issued on Feb. 6, 2023, p. 1-p. 9.

*Primary Examiner* — Anne Marie Antonucci
*Assistant Examiner* — Jewel Ashley Kuntz
(74) *Attorney, Agent, or Firm* — JCIPRNET

(57) ABSTRACT

A system and a method of controlling a drone based on pressure are provided. The method includes: installing a pressure sensor under a bearing surface of a platform body; obtaining a pressure distribution map via the pressure sensor; obtaining a centroid on the bearing surface by inputting the pressure distribution map to a machine learning model; calculating a vector from a reference centroid on the bearing surface to the centroid; and controlling a flight of the drone according to the vector.

22 Claims, 18 Drawing Sheets

(56) References Cited

U.S. PATENT DOCUMENTS

| | | | |
|---|---|---|---|
| 10,514,773 | B2 | 12/2019 | Bonora et al. |
| 10,545,495 | B2 | 1/2020 | Kim et al. |
| 10,603,577 | B2 | 3/2020 | Matina |
| 2010/0035688 | A1 | 2/2010 | Picunko |
| 2011/0202306 | A1* | 8/2011 | Eng .................... A63F 13/24 |
| | | | 702/150 |
| 2014/0031123 | A1 | 1/2014 | Sarrafzadeh et al. |
| 2017/0185168 | A1* | 6/2017 | Bonora ................ G06F 3/0334 |
| 2017/0355453 | A1* | 12/2017 | Kim ...................... B64D 31/06 |
| 2019/0094849 | A1* | 3/2019 | Kim .................... G05D 1/0044 |
| 2019/0339791 | A1 | 11/2019 | Alanajadah et al. |
| 2019/0370545 | A1* | 12/2019 | Josephson ........... G06F 3/04812 |
| 2021/0402255 | A1* | 12/2021 | Fung ................ A63B 69/0064 |
| 2023/0263469 | A1* | 8/2023 | Choffin .............. A61B 5/1071 |
| | | | 600/592 |

FOREIGN PATENT DOCUMENTS

| | | | |
|---|---|---|---|
| CN | 106155068 | | 11/2016 |
| CN | 108159685 | | 6/2018 |
| KR | 102031982 B1 * | 10/2019 | |
| TW | I459234 | | 11/2014 |
| TW | I544952 | | 8/2016 |
| WO | WO-2017096097 A1 * | 6/2017 | ............ G06F 3/013 |
| WO | WO-2019165501 A1 * | 9/2019 | |

\* cited by examiner

SYSTEM AND METHOD OF CONTROLLING DRONE BASED ON PRESSURE

CROSS-REFERENCE TO RELATED APPLICATION

This application claims the priority benefit of Taiwan application serial no. 111139954, filed on Oct. 21, 2022. The entirety of the above-mentioned patent application is hereby incorporated by reference herein and made a part of this specification.

BACKGROUND

Technical Field

The disclosure relates to a drone technology, and in particular relates to a system and method of controlling a drone based on pressure.

Description of Related Art

The current unmanned aircraft vehicle (UAV) is mainly operated by the user using a radio remote control. However, the operation mode of the radio remote control is relatively complicated, and it is difficult for the general public to use the radio remote control to flexibly operate the unmanned aircraft vehicle. In addition, the operation mode of the radio remote control is relatively simple and not entertaining. In order to increase the entertainment, the operation method may be improved so that the unmanned aircraft vehicle may be operated through the body movements of the user. A wearable sensing device worn on the user may be used to sense the movements of the user to operate the unmanned aircraft vehicle, but the maintenance cost of the wearable sensing device is relatively high. An image positioning system may determine the movements of the user through image recognition technology to operate the unmanned aircraft vehicle. However, if the resolution of the image is insufficient, the user is not be able to operate the unmanned aircraft vehicle with great sensitivity.

SUMMARY

The disclosure provides a system and method for controlling a drone based on pressure, which may control the flight of the drone according to the pressure caused by different movements of the user.

A system of controlling a drone based on pressure of the disclosure includes a processor, a storage medium, a transceiver, a platform body, and a pressure sensor. The transceiver is communicatively connected to the drone. The storage medium stores a machine learning model. The platform body includes a bearing surface. The pressure sensor is installed under the bearing surface. The processor is coupled to the storage medium, the transceiver, and the pressure sensor. The processor is configured to perform the following operation. A pressure distribution map is obtained via the pressure sensor. A centroid on the bearing surface is obtained by inputting the pressure distribution map into the machine learning model. A vector is calculated from a reference centroid to the centroid on the bearing surface. A flight of the drone is controlled according to the vector.

In an embodiment of the disclosure, the processor is further configured to perform the following operation. The drone is controlled to move horizontally according to the vector.

In an embodiment of the disclosure, the processor is further configured to perform the following operation. In response to a magnitude of the vector decreasing to less than a threshold value while the drone is moving horizontally, the drone is controlled to stop moving horizontally.

In an embodiment of the disclosure, the processor includes a calibration mode. The processor in the calibration mode is configured to perform the following operation. A reference pressure distribution map is obtained via the pressure sensor. The reference centroid is obtained by inputting a reference pressure distribution map into the machine learning model.

In an embodiment of the disclosure, the processor is further configured to perform the following operation. An area difference between the reference pressure distribution map and the pressure distribution map is calculated. The drone is controlled to move vertically according to the area difference.

In an embodiment of the disclosure, the processor is further configured to perform the following operation. In response to the area difference being positive, the drone is controlled to move vertically upward. In response to the area difference being negative, the drone is controlled to move vertically downward.

In an embodiment of the disclosure, the processor is further configured to perform the following operation. In response to the area difference changing from positive to negative or from negative to positive when the drone moves vertically, the drone is controlled to stop moving vertically.

In an embodiment of the disclosure, the processor is further configured to perform the following operation. A reference pressure distribution map is obtained. The reference pressure distribution map includes a first reference pressure distribution and a second reference pressure distribution. The pressure distribution map includes a first pressure distribution and a second pressure distribution. A first area difference between the first reference pressure distribution and the first pressure distribution is calculated, and a second area difference between the second reference pressure distribution and the second pressure distribution is calculated. A yaw of the drone is controlled according to the first area difference and the second area difference.

In an embodiment of the disclosure, the processor is further configured to perform the following operation. In response to the first area difference being greater than the threshold value and the second area difference being less than or equal to the threshold value, the drone is controlled to yaw in a first direction.

In an embodiment of the disclosure, the pressure sensor detects a first region and a second region, in which the first region and the second region are not connected. The processor is further configured to perform the following operation. A pressure sensing value is obtained via the second region of the pressure sensor. A pressure difference is calculated between a reference pressure sensing value and the pressure sensing value. The drone is controlled to move vertically according to the pressure difference.

In an embodiment of the disclosure, the first region is used to measure a pressure exerted by a hip of the user on the bearing surface. The second region is used to measure a pressure exerted by a palm of the user on the bearing surface.

In an embodiment of the disclosure, the processor is further configured to perform the following operation. In response to the pressure difference being negative, the drone is controlled to move vertically upward. In response to the pressure difference being positive, the drone is controlled to move vertically downward.

In an embodiment of the disclosure, the processor is further configured to perform the following operation. In response to the pressure difference changing from positive to negative or from negative to positive when the drone moves vertically, the drone is controlled to stop moving vertically.

In an embodiment of the disclosure, the platform body further includes a handrail, in which the system further includes an accelerometer and a gyroscope. The accelerometer is installed in the handrail and coupled to the processor. The gyroscope is installed in the handrail and coupled to the processor.

In an embodiment of the disclosure, the processor is further configured to perform the following operation. Acceleration is obtained via the accelerometer. Angular velocity is obtained via the gyroscope. The centroid on the bearing surface is obtained by inputting the pressure distribution map, the acceleration, and the angular velocity into the machine learning model.

In an embodiment of the disclosure, the system further includes a display device. The display device is communicatively connected to an image capturing device of the drone, in which the display device displays an image provided by the image capturing device.

In an embodiment of the disclosure, the display device includes a head mounted display. The head mounted display receives a first signal to provide a mixed reality scene associated with the image according to the first signal.

In an embodiment of the disclosure, the system further includes a remote control. The remote control is communicatively connected to the head mounted display, in which the remote control transmits a second signal to the head mounted display.

In an embodiment of the disclosure, the head mounted display is communicatively connected to the processor. The processor is further configured to perform the following operation. Whether a stepping behavior occurs on the bearing surface is determined via the pressure sensor. In response to the stepping behavior, the second signal is transmitted to the head mounted display.

In an embodiment of the disclosure, the system further includes a drone. The drone includes an altitude sensor, in which the altitude sensor obtains an altitude. The drone receives a second signal from the processor, and moves vertically downward according to the second signal. In response to the altitude being less than a threshold value, the drone stops moving vertically downward.

In an embodiment of the disclosure, when the drone stops moving vertically downward, the drone lands in response to continuously receiving the second signal.

In an embodiment of the disclosure, the machine learning model includes a deep learning model.

A method for controlling a drone based on pressure of the disclosure includes the following operation. A pressure sensor is installed under a bearing surface of a platform body. A pressure distribution map is obtained via the pressure sensor. A centroid on the bearing surface is obtained by inputting the pressure distribution map into the machine learning model. A vector is calculated from a reference centroid to the centroid on the bearing surface. A flight of the drone is controlled according to the vector.

Based on the above, the system of the disclosure may sense the pressure change caused by the user and the centroid position of the user, and control the drone to perform flight movements such as translation, pitch, or yaw according to the sensing results.

DETAILED DESCRIPTION OF DISCLOSED EMBODIMENTS

Figure 1:
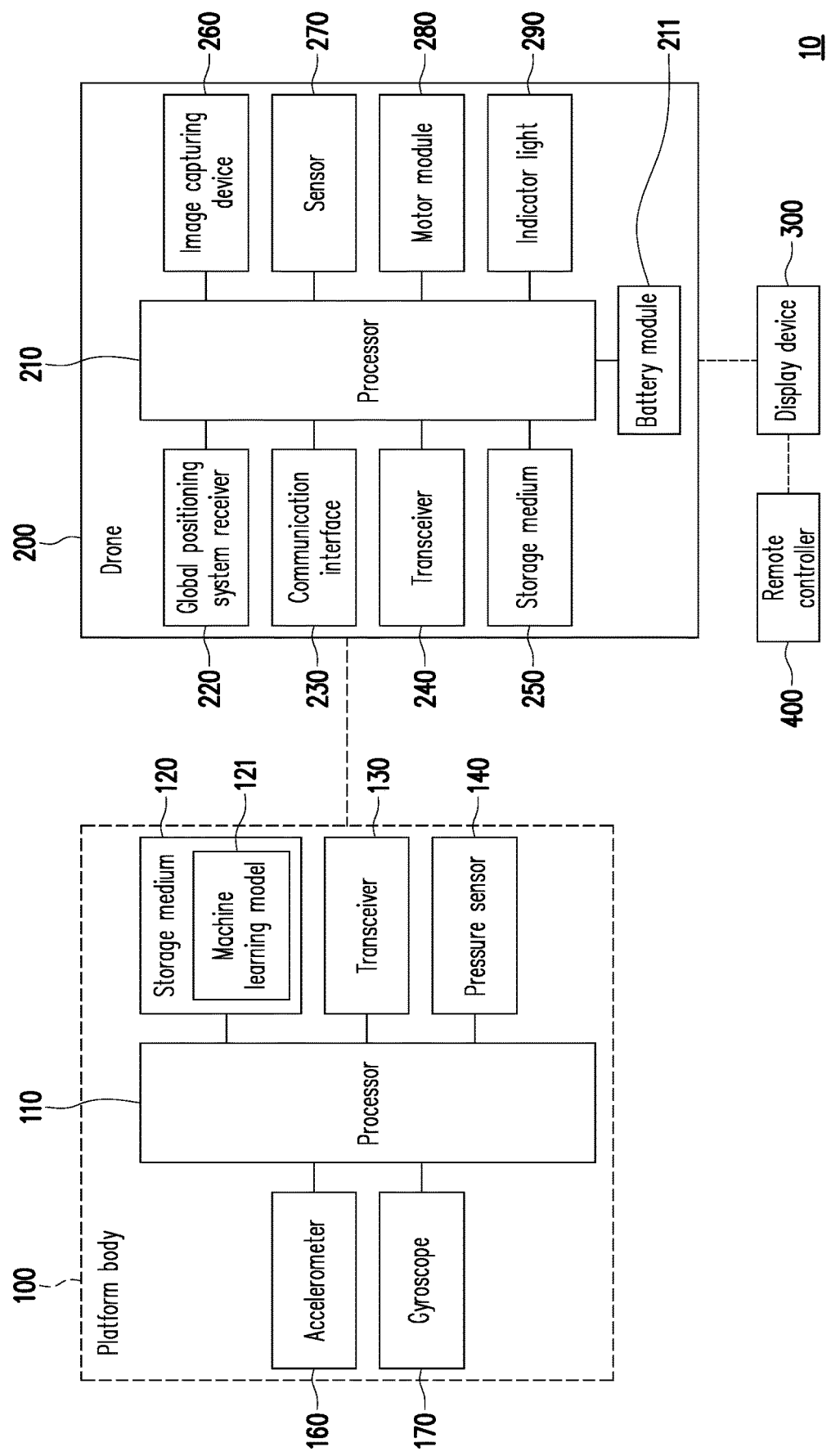
FIG. 1 is a schematic diagram of a system of controlling a drone based on pressure according to an embodiment of the disclosure.

In order to make the content of the disclosure easier to understand, the following specific embodiments are illustrated as examples of the actual implementation of the disclosure. In addition, wherever possible, elements/components/steps with the same reference numerals in the drawings and embodiments represent the same or similar parts.

FIG. 1 is a schematic diagram of a system 10 of controlling a drone based on pressure according to an embodiment of the disclosure. The system 10 may include a processor 110, a storage medium 120, a transceiver 130, a pressure sensor 140, an accelerometer 160, and a gyroscope 170. The system 10 may also include a platform body 100. In an embodiment, the processor 110, the storage medium 120, the transceiver 130, the pressure sensor 140, the accelerometer 160, and the gyroscope 170 may be installed or embedded in the platform body 100. In an embodiment, the system 10 may further include a drone 200, a display device 300, or a remote controller 400. The drone 200 may be communicatively connected to the processor 110 or the display device 300, and the display device 300 may be communicatively connected to the remote controller 400.

The processor 110 is, for example, a central processing unit (CPU), or other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or other similar elements, or a combination of the elements thereof. The processor 110 may be coupled to the storage medium 120, the transceiver 130, the pressure sensor 140, the accelerometer 160, and the gyroscope 170, and the processor 110 may access and perform various modules and various applications stored in the storage medium 120.

The storage medium 120 is, for example, any type of fixed or removable random access memory (RAM), read-only memory (ROM), flash memory, hard disk drive (HDD), solid state drive (SSD), or similar elements, or a combination of the elements thereof configured to store multiple modules or various applications executable by the processor 110. In this embodiment, the storage medium 120 may store and include a machine learning model 121, in which the machine learning model 121 is, for example, a deep learning (DL) model, but the disclosure is not limited thereto.

The transceiver 130 transmits and receives signals in a wireless or wired manner. The transceiver 130 may also perform operations such as low noise amplification, impedance matching, frequency mixing, up or down frequency conversion, filtering, amplification, and the like. The processor 110 may be communicatively connected to the drone 200 through the transceiver 130 to control the flight of the drone 200. In an embodiment, the processor 110 may communicate with the drone 200 via a 2.4 GHz signal, but the disclosure is not limited thereto.

The pressure sensor 140 is used to measure the pressure caused by the user of the system 10. The pressure sensor 140 may include two sensing regions that are not connected to each other to respectively measure the pressure caused by the user in different regions. The accelerometer 160 and the gyroscope 170 are used to respectively measure the acceleration and angular velocity caused by the force exerted by the user of the system 10.

The drone 200 may include a processor 210, a battery module 211, a global positioning system (GPS) receiver 220, a communication interface 230, a transceiver 240, a storage medium 250, an image capturing device 260, a sensor 270, a motor module 280, and an indicator light 290.

The processor 210 is, for example, a central processing unit, or other programmable general-purpose or special-purpose micro control unit, microprocessor, digital signal processor, programmable controller, application specific integrated circuit, graphics processing unit, image signal processor, image processing unit, arithmetic logic unit, complex programmable logic device, field programmable gate array, or other similar elements, or a combination of the elements thereof. The processor 210 may be coupled to the battery module 211, the GPS receiver 220, the communication interface 230, the transceiver 240, the storage medium 250, the image capturing device 260, the sensor 270, the motor module 280, and the indicator light 290, and the processor 210 may access and perform various modules and various applications stored in the storage medium 250.

The GPS receiver 220 may receive GPS signals, in which the processor 210 may position the drone 200 according to the GPS signals.

The communication interface 230 is, for example, a universal serial bus (USB). The processor 210 may receive external power through the communication interface 230 to charge the battery module 211, in which the battery module 211 is used for powering the drone 200. The processor 210 may also receive external signals through the communication interface 230 to set various parameters and functions of the drone 200.

The transceiver 240 transmits and receives signals in a wireless manner. The transceiver 240 may also perform operations such as low noise amplification, impedance matching, frequency mixing, up or down frequency conversion, filtering, amplification, and the like. The drone 200 may be communicatively connected to the system 10 or the display device 300 via the transceiver 240.

The storage medium 250 is, for example, any type of fixed or removable random access memory, read-only memory, flash memory, hard disk drive, solid state drive or similar elements, or a combination of the elements thereof configured to store multiple modules or various applications executable by the processor 210.

The image capturing device 260 is, for example, a camera or a photographing device for capturing images. The image capturing device 260 may include an image sensor such as a complementary metal oxide semiconductor (CMOS) or a charge coupled device (CCD). The processor 210 may obtain images around the drone 200 via the image capturing device 260.

The sensor 270 is used for sensing environmental parameters around the drone 200. In an embodiment, the sensor 270 may include an altitude sensor. The processor 210 may obtain the altitude of the drone 200 via the sensor 270. The altitude sensor includes, for example, lidar or an ultrasonic sensor.

The motor module 280 includes one or more motors, in which the motors may be connected to the wings of the drone 200. The processor 210 may control the flight of the drone 200 via the motor module 280.

The indicator light 290 is, for example, a light-emitting diode (LED). The indicator light 290 may provide a light source for identifying the drone 200 or for optical communication.

The display device 300 may include a liquid-crystal display (LCD), a light-emitting diode (LED) display, a vacuum fluorescent display (VFD), a plasma display panel (PDP), an organic light-emitting display (OLED) or a field-emission display (FED). In an embodiment, the display device 300 may include a head mounted display. The display device 300 may be communicatively connected to the image capturing device 260 of the drone 200 to receive images captured by the image capturing device 260. The display device 300 may also receive signals from the drone 200 or the remote controller 400, provide a mixed reality (MR) scene associated with the image captured by the drone 200 to the user according to the received signal, or present an image with a mixed reality scene in combination with a signal provided by a game server. A mixed reality may include virtual reality (VR) or augmented reality (AR).

The remote controller 400 may be communicatively connected to the display device 300. The user may operate the remote controller 400 to transmit a signal to the display device 300. The display device 300 may provide the mixed reality scene to the user according to the signal. In other words, the user may interact with the mixed reality scene through the remote control 400.

Figure 2:
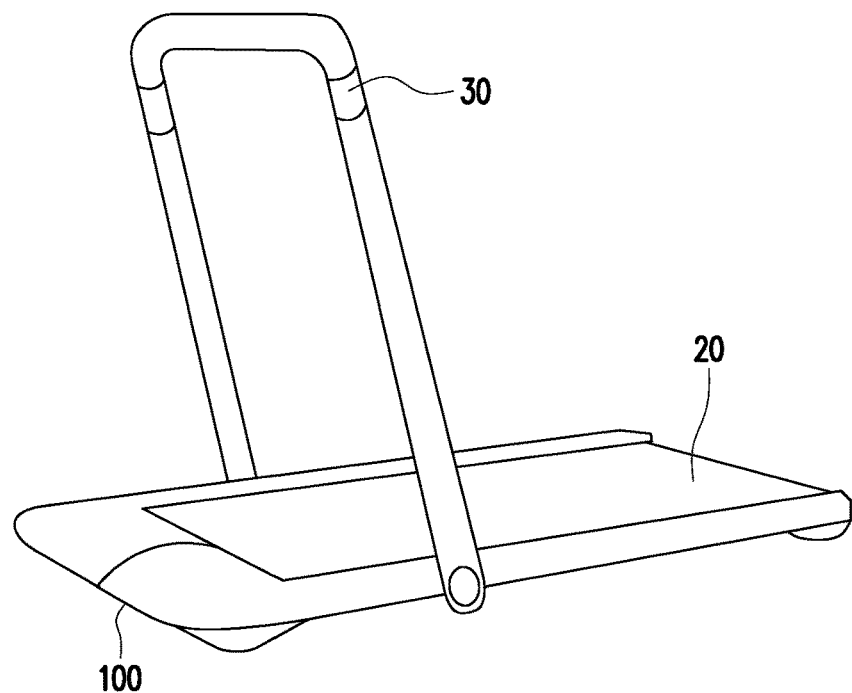
FIG. 2 is a schematic diagram of a platform body according to an embodiment of the disclosure.

FIG. 2 is a schematic diagram of a platform body 100 according to an embodiment of the disclosure. The platform body 100 may include a bearing surface 20 and a handrail 30. The pressure sensor 140 may be installed under the bearing surface 20 to measure the pressure caused by the user on various positions on the bearing surface 20. The accelerometer 160 or the gyroscope 170 may be disposed in the handrail 30. When the user moves the body to exert force on the handrail 30, the accelerometer 160 or the gyroscope 170 may respectively measure the acceleration or angular velocity of the force exerted by the user.

Figure 3:
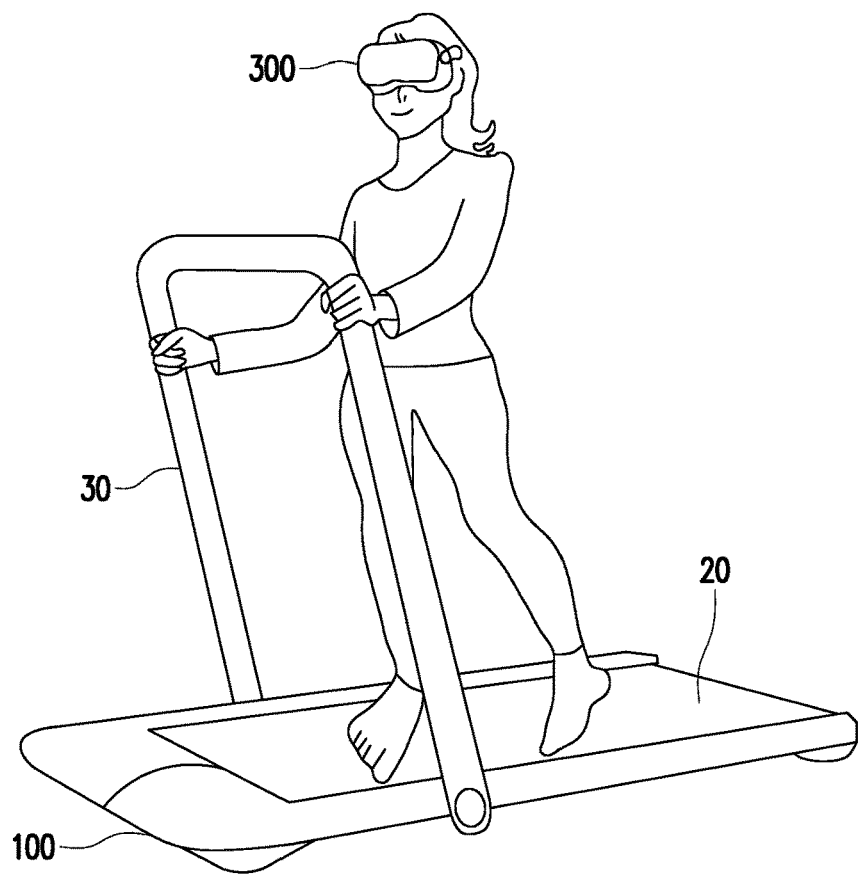
FIG. 3 and FIG. 4 are schematic diagrams of a user maintaining a standing posture on a bearing surface according to an embodiment of the disclosure.
Figure 4:
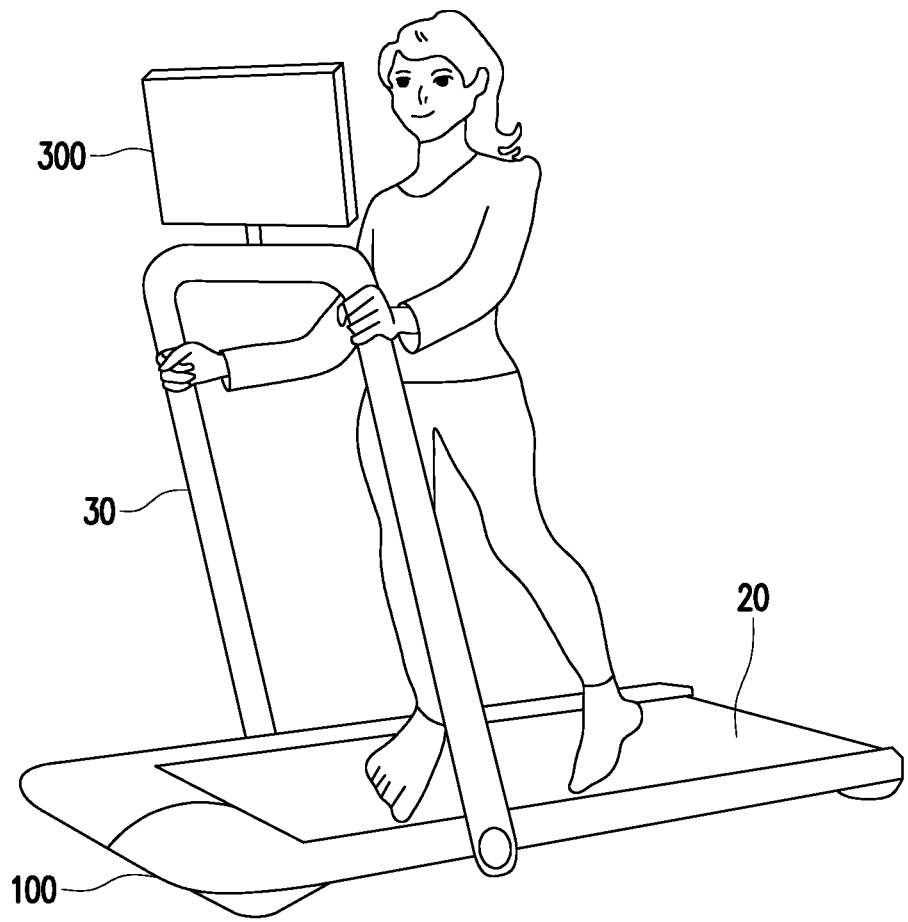

The processor 110 of the disclosure may measure the pressure exerted by the user on the bearing surface 20, and then control the flight of the drone 200 according to the pressure. In an embodiment, the user may maintain a standing posture on the bearing surface 20 to control the drone 200. FIG. 3 and FIG. 4 are schematic diagrams of a user maintaining a standing posture on a bearing surface 20 according to an embodiment of the disclosure. FIG. 3 corresponds to a situation where the display device 300 is a head mounted display, and FIG. 4 corresponds to a situation where the display device 300 is a non-head mounted display.

Figure 5:
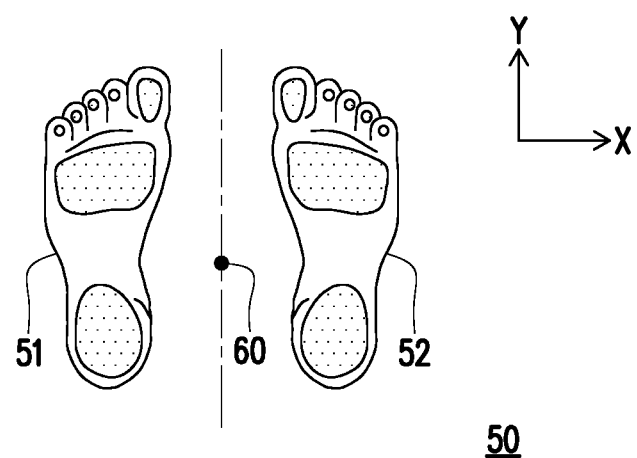
FIG. 5 is a schematic diagram of a reference pressure distribution map and a reference centroid corresponding to a standing posture according to an embodiment of the disclosure.

FIG. 5 is a schematic diagram of a reference pressure distribution map 50 and a reference centroid 60 corresponding to a standing posture according to an embodiment of the disclosure. The processor 110 may include a calibration mode. Before the processor 110 controls the flight of the drone 200, the processor 110 may first enter the calibration mode. When the processor 110 is in the calibration mode, the user may maintain a normal standing posture on the bearing surface 20. At this time, the processor 110 may obtain the reference pressure distribution map 50 of the sole via the pressure sensor 140 installed under the bearing surface 20. Next, the processor 110 may input the reference pressure distribution map 50 to the machine learning model 121, and then the machine learning model 121 outputs the reference centroid 60 corresponding to the reference pressure distribution map 50, in which the reference centroid 60 represents the centroid position of the user who maintains a normal standing posture on the bearing surface 20.

In an embodiment, the reference centroid 60 is related to acceleration and angular velocity. Specifically, when the processor 110 is in the calibration mode, the user may hold the handrail 30 lightly. The accelerometer 160 and the gyroscope 170 installed in the handrail 30 may respectively measure the reference acceleration and the reference angular velocity caused by the force exerted by the user on the handrail 30. The processor 110 may input the reference pressure distribution map 50, the reference acceleration, and the reference angular velocity to the machine learning model 121, and then the machine learning model 121 outputs the reference centroid 60 corresponding to the reference pressure distribution map 50.

Figure 6:
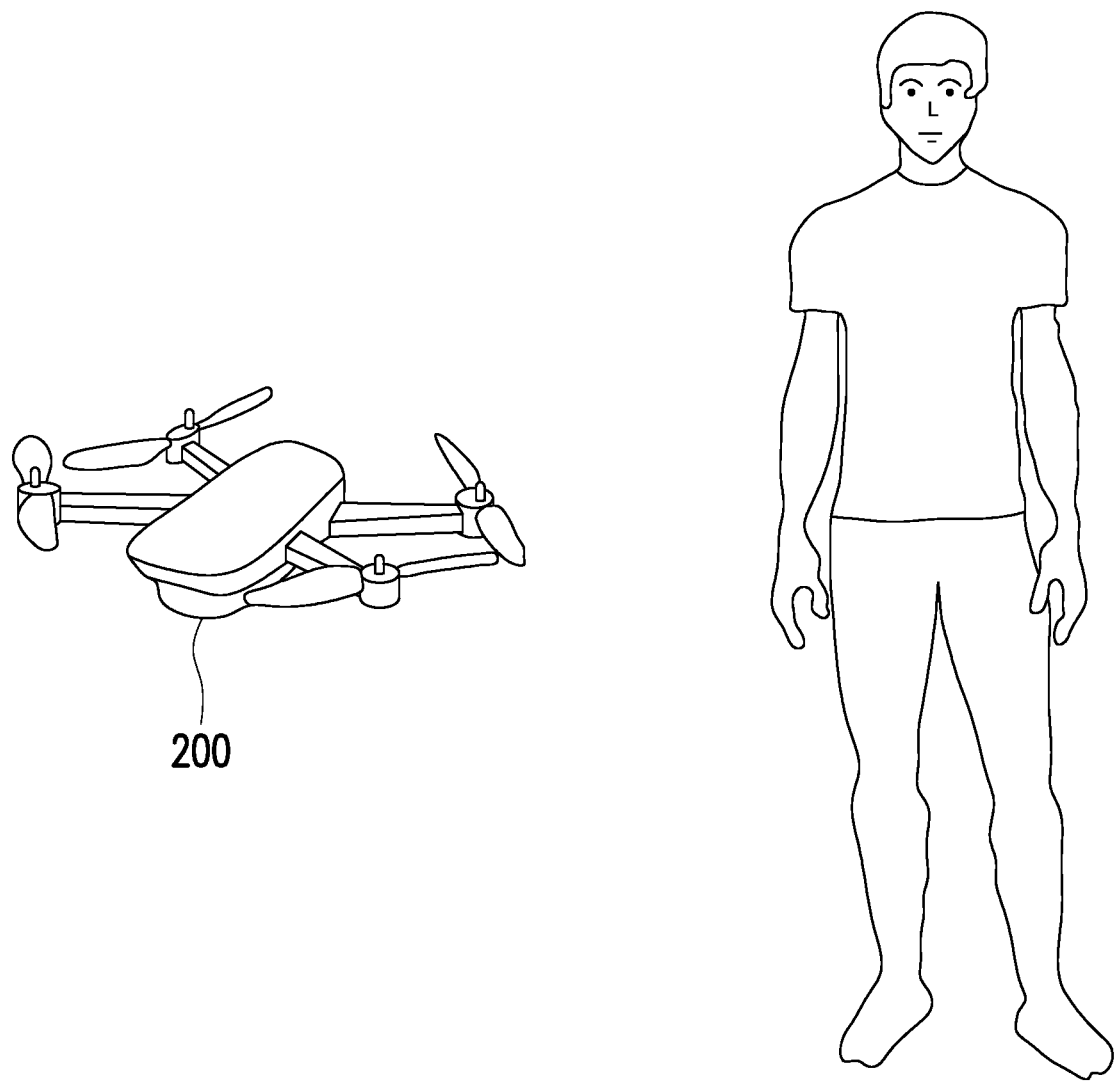
FIG. 6 is a schematic diagram of a drone hovering in the air according to an embodiment of the disclosure.

After obtaining the reference pressure distribution map 50 and the reference centroid 60 corresponding to the normal standing posture of the user, the processor 110 may measure the pressure distribution map (i.e., the current pressure distribution map) caused by the pressure currently exerted on the bearing surface 20 by the sole of the user via the pressure sensor 140. The processor 110 may input the current pressure distribution map to the machine learning model 121 to obtain the current centroid on the bearing surface 20. The processor 110 may control the flight of the drone 200 according to the reference pressure distribution map 50, the reference centroid 60, the current pressure distribution map, and the current centroid. If the processor 110 determines that the current pressure distribution map or the current centroid is insufficient to control the movement of the drone 200, the processor 110 may control the drone 200 to maintain hovering, as shown in FIG. 6.

In an embodiment, the processor 110 may calculate the area difference between the reference pressure distribution map 50 and the current pressure distribution map, and control the drone 200 to move vertically according to the area difference. If the area difference is positive, the processor 110 may control the drone 200 to move vertically upward. If the area difference is negative, the processor 110 may control the drone 200 to move vertically downward.

Figure 7:
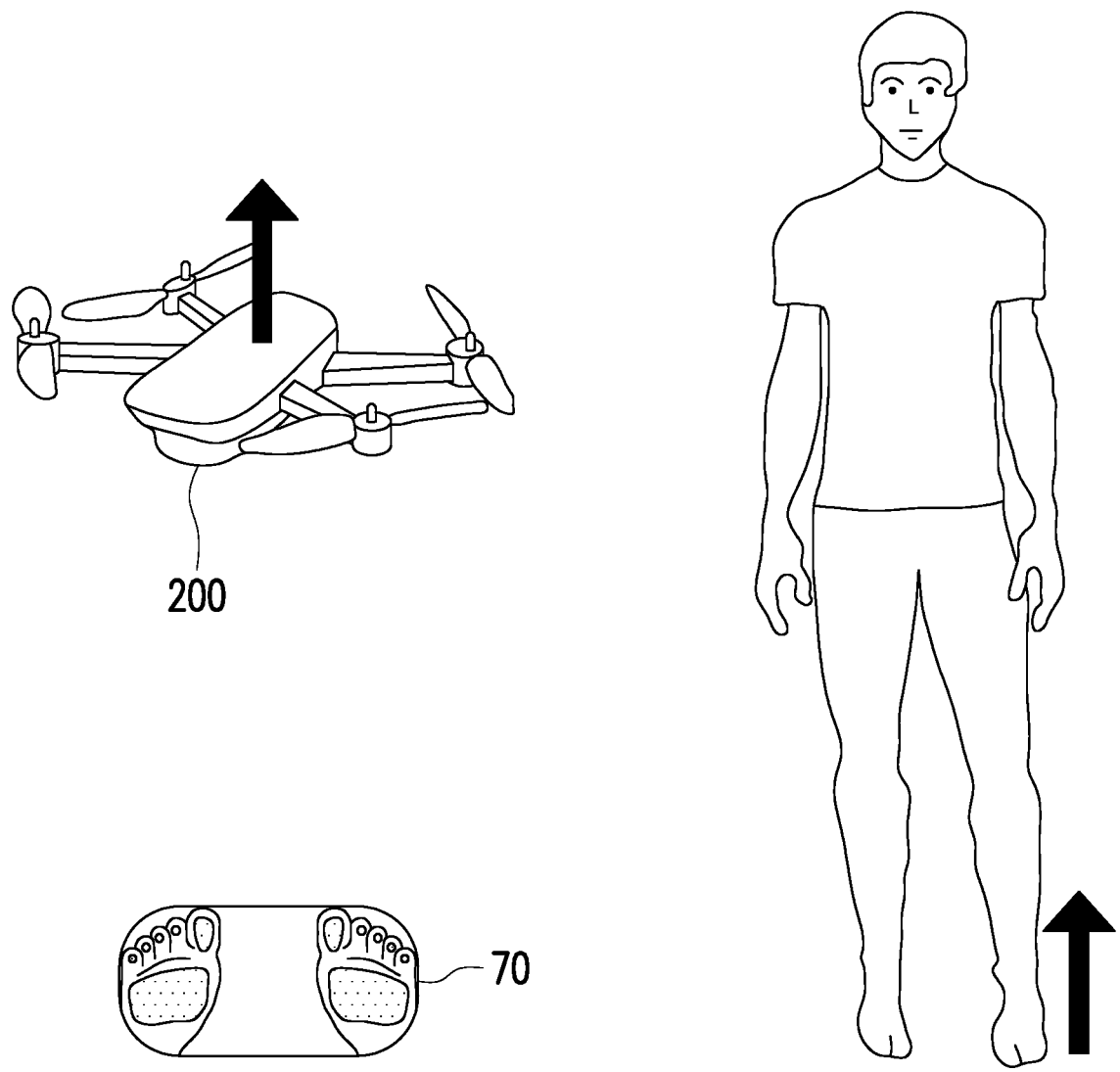
FIG. 7 is a schematic diagram of a drone moving vertically upward according to an embodiment of the disclosure.

FIG. 7 is a schematic diagram of a drone 200 moving vertically upward according to an embodiment of the disclosure. The processor 110 may control the drone 200 to move vertically upward when the user is on tiptoe. When the user is on tiptoe, the contact area between the sole of the user and the bearing surface 20 is decreased, and the area of the current pressure distribution map 70 is less than the reference pressure distribution map 50. Accordingly, the processor 110 may control the drone 200 to move vertically upward in response to the area difference between the reference pressure distribution map 50 and the current pressure distribution map 70 being positive.

Figure 8:
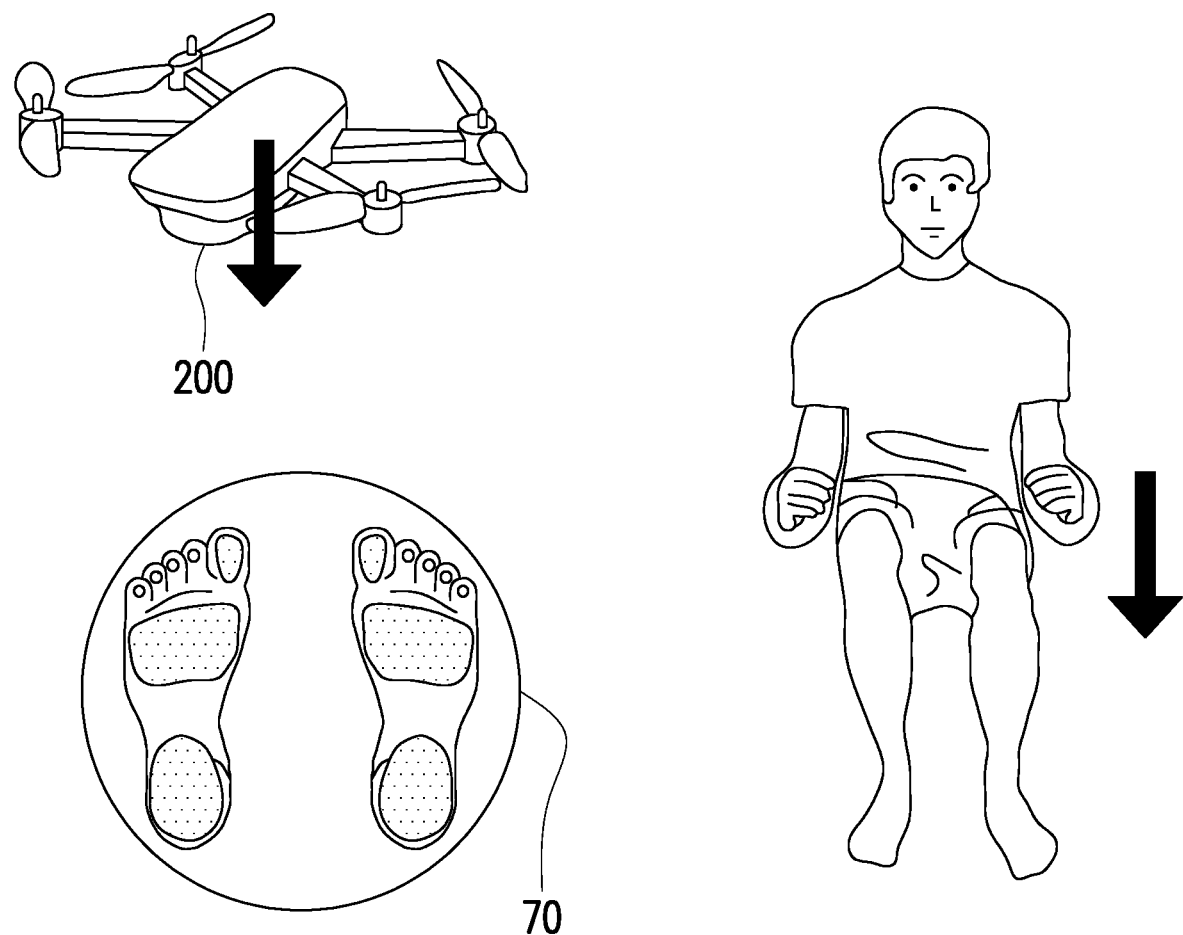
FIG. 8 is a schematic diagram of a drone moving vertically downward according to an embodiment of the disclosure.

FIG. 8 is a schematic diagram of a drone 200 moving vertically downward according to an embodiment of the disclosure. The processor 110 may control the drone 200 to move vertically downward when the user squats. When the user squats, the contact area between the sole of the user and the bearing surface 20 is increased, and the area of the current pressure distribution map 70 is greater than the reference pressure distribution map 50. Accordingly, the processor 110 may control the drone 200 to move vertically downward in response to the area difference between the reference pressure distribution map 50 and the current pressure distribution map 70 being negative.

In an embodiment, in response to the area difference changing from positive to negative or from negative to positive when the drone 200 moves vertically, the processor 110 may control the drone 200 to stop moving vertically. Specifically, the user may be on tiptoe to control the drone 200 to move vertically upward. When the user changes from the tiptoe posture to the normal standing posture, the contact area between the sole of the user and the bearing surface 20 is increased instantly, thereby the area difference between the reference pressure distribution map 50 and the current pressure distribution map 70 is changed from positive to negative. Accordingly, the processor 110 may control the drone 200 to stop moving upward. On the other hand, the user may squat to control the drone 200 to move vertically downward. When the user changes from the squatting posture to the normal standing posture, the contact area between the sole of the user and the bearing surface 20 is decreased instantly, thereby the area difference between the reference pressure distribution map 50 and the current pressure distribution map 70 is changed from negative to positive. Accordingly, the processor 110 may control the drone 200 to stop moving downward.

In an embodiment, the processor 110 may decide whether to control the drone 200 to stop moving vertically downward according to the altitude measured by the sensor 270 of the drone 200. Specifically, the drone 200 may receive a signal from the processor 110 (i.e., a signal instructing the drone 200 to move vertically downward) to move vertically downward. During the period when the drone 200 receives the signal and moves vertically downward, in response to the altitude being less than the threshold value, the processor 210 of the drone 200 may control the motor module 280 to stop the drone 200 from moving vertically downward. Accordingly, the crash of the drone 200 due to improper operation by the user may be avoided.

In an embodiment, when the drone 200 stops moving vertically downward, the processor 110 of the drone 200 may land in response to continuously receiving signals (i.e., signals instructing the drone 200 to move vertically downward) from the system 10. In other words, when the user squats so that the drone 200 descends to a lowest altitude, the user may continuously maintain the squatting posture to control the drone 200 to land.

In an embodiment, the processor 110 may calculate a vector from the reference centroid 60 to the current centroid, and control the horizontal movement of the drone 200 according to the vector. The moving velocity of the drone 200 may be proportional to the magnitude of the vector, and the moving direction of the drone 200 may be the same as the direction of the vector. The greater the magnitude of the vector from the reference centroid 60 to the current centroid, the faster the flight velocity of the drone 200. The smaller the magnitude of the vector from the reference centroid 60 to the current centroid, the smaller the flight velocity of the drone 200.

Figure 9:
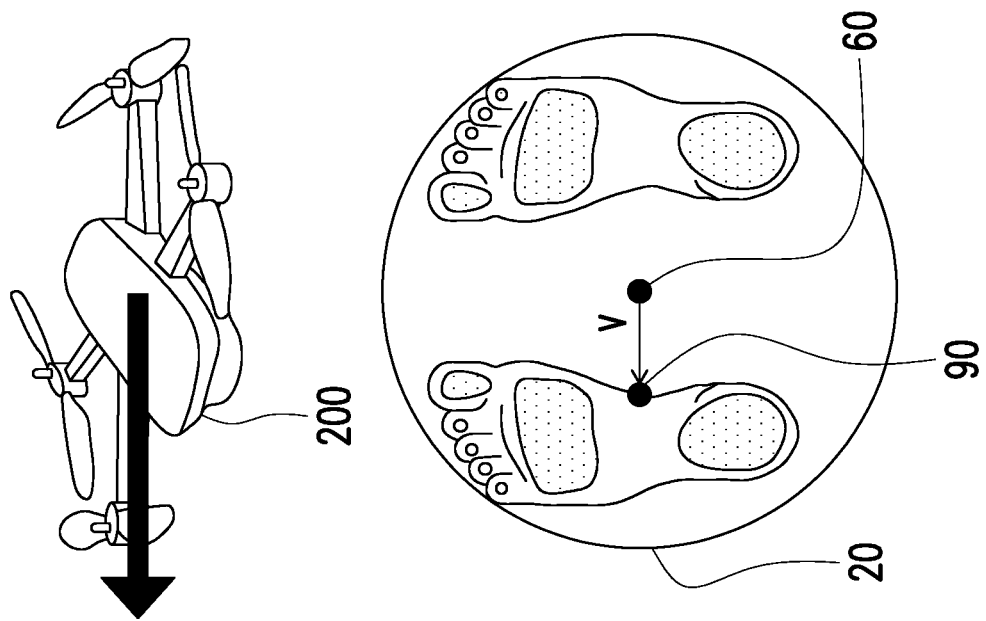
FIG. 9 is a schematic diagram of a drone moving horizontally to the right according to an embodiment of the disclosure.

FIG. 9 is a schematic diagram of a drone 200 moving horizontally to the right according to an embodiment of the disclosure. When the body of the user tilts to the right, the vector V between the reference centroid 60 and the current centroid 90 points to the right. Accordingly, the processor 110 may control the drone 200 to fly parallel to the right.

Figure 10:
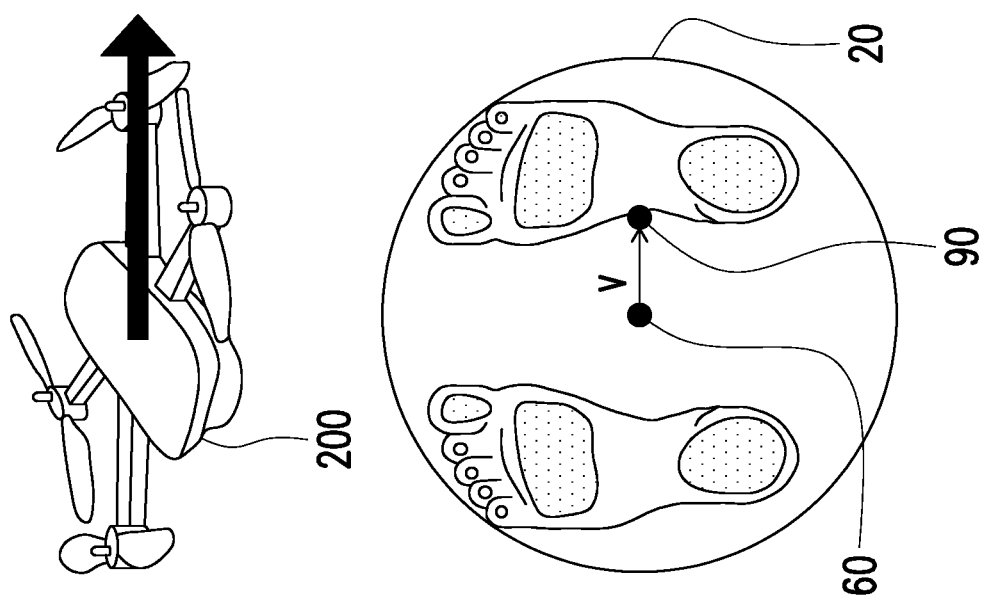
FIG. 10 is a schematic diagram of a drone moving horizontally to the left according to an embodiment of the disclosure.

FIG. 10 is a schematic diagram of a drone 200 moving horizontally to the left according to an embodiment of the disclosure. When the body of the user tilts to the left, the vector V between the reference centroid 60 and the current centroid 90 points to the left. Accordingly, the processor 110 may control the drone 200 to fly parallel to the left.

Figure 11:
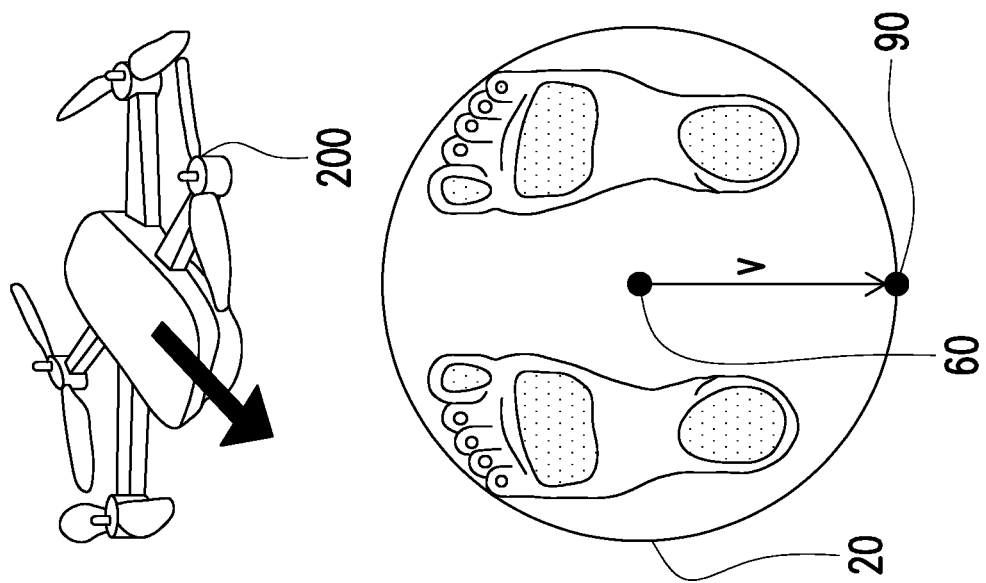
FIG. 11 is a schematic diagram of a drone moving horizontally forward according to an embodiment of the disclosure.

FIG. 11 is a schematic diagram of a drone 200 moving horizontally forward according to an embodiment of the disclosure. When the body of the user tilts forward, the vector V between the reference centroid 60 and the current centroid 90 points forward. Accordingly, the processor 110 may control the drone 200 to fly forward in parallel.

Figure 12:
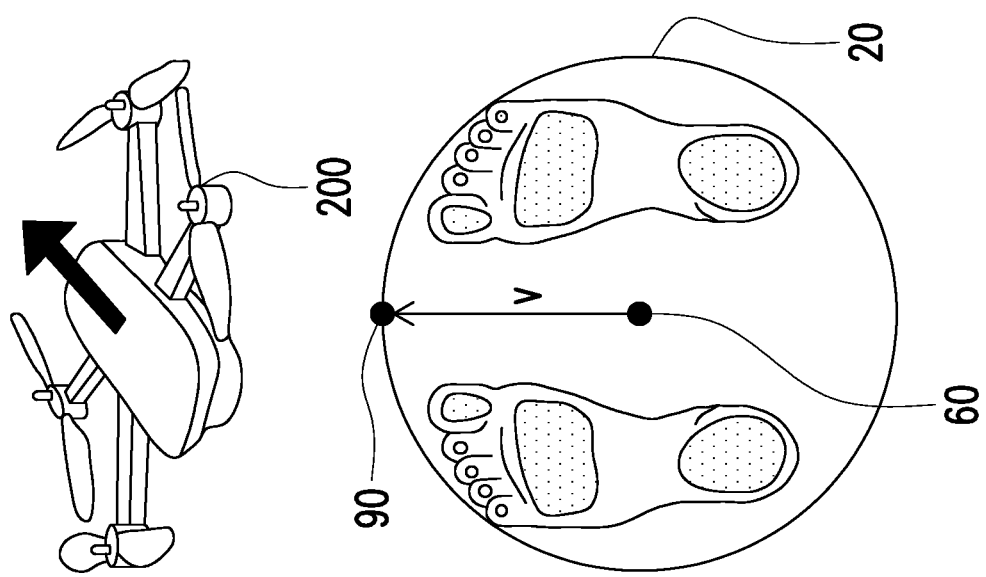
FIG. 12 is a schematic diagram of a drone moving horizontally backward according to an embodiment of the disclosure.

FIG. 12 is a schematic diagram of a drone 200 moving horizontally backward according to an embodiment of the disclosure. When the body of the user tilts backward, the vector V between the reference centroid 60 and the current centroid 90 points backward. Accordingly, the processor 110 may control the drone 200 to fly backward in parallel.

In an embodiment, the processor 110 may control the drone 200 to stop moving horizontally in response to the magnitude |V| of the vector V between the reference centroid 60 and the current centroid 90 decreasing to less than a threshold value when the drone 200 moves horizontally. Specifically, when the user tilts the body, the drone 200 may continuously receive signals from the processor 110 to move horizontally. The magnitude |V| of the vector V decreases as the body of the use transitions from a tilted posture to a normal standing posture. The processor 110 may determine that the user has returned to a normal standing posture when the magnitude |V| of the vector V is decreased to less than the threshold value. Accordingly, the processor 110 may control the drone 200 to stop moving horizontally.

In an embodiment, the processor 110 may control the yaw of the drone 200 according to the rotation direction of the upper body of the user. If the upper body of the user turns to the left, the processor 110 may control the drone 200 to yaw to the left. If the upper body of the user turns to the right, the processor 110 may control the drone 200 to yaw to the right.

Figure 13:
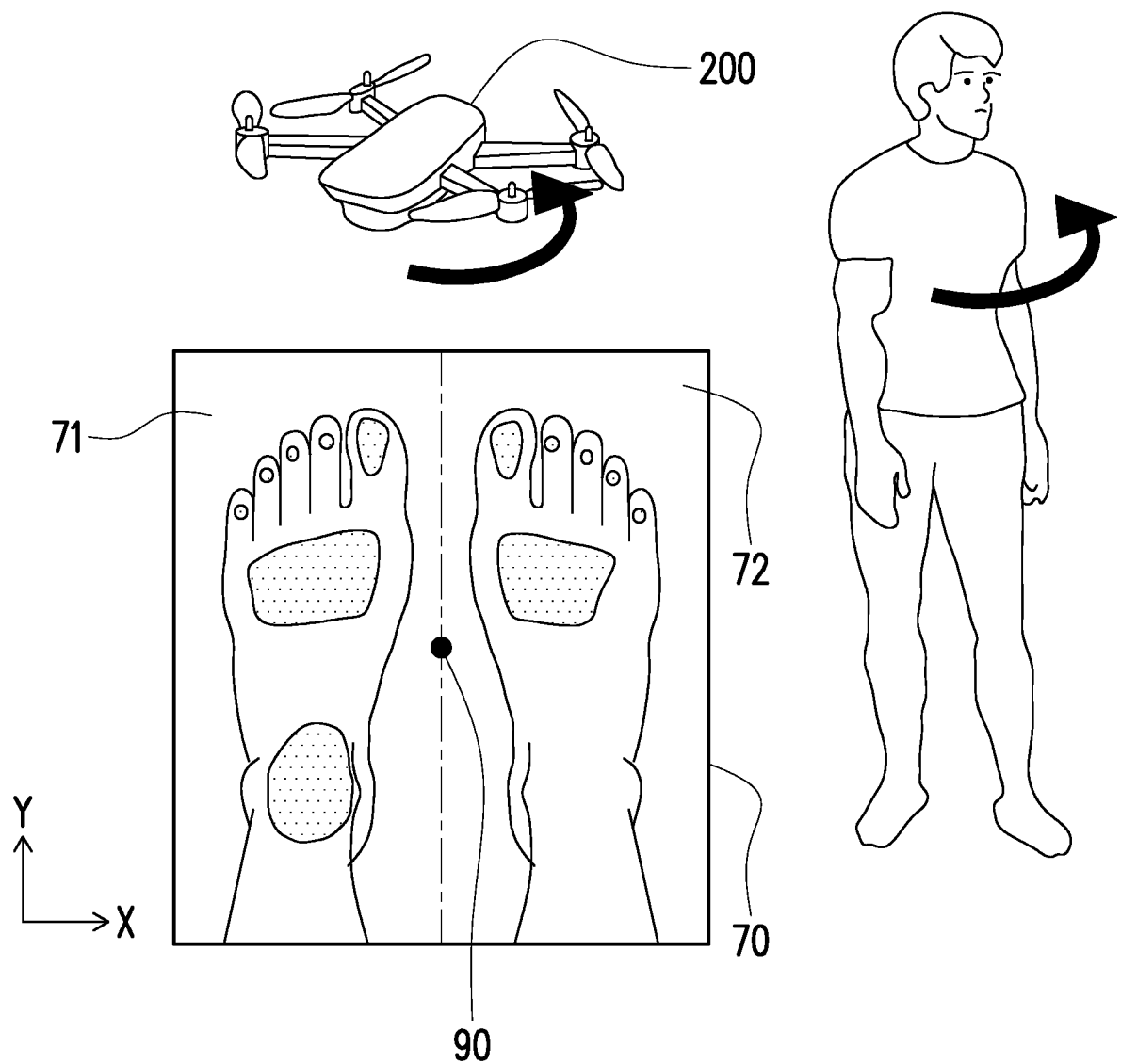
FIG. 13 is a schematic diagram of a drone yawing to the left according to an embodiment of the disclosure.
Figure 14:
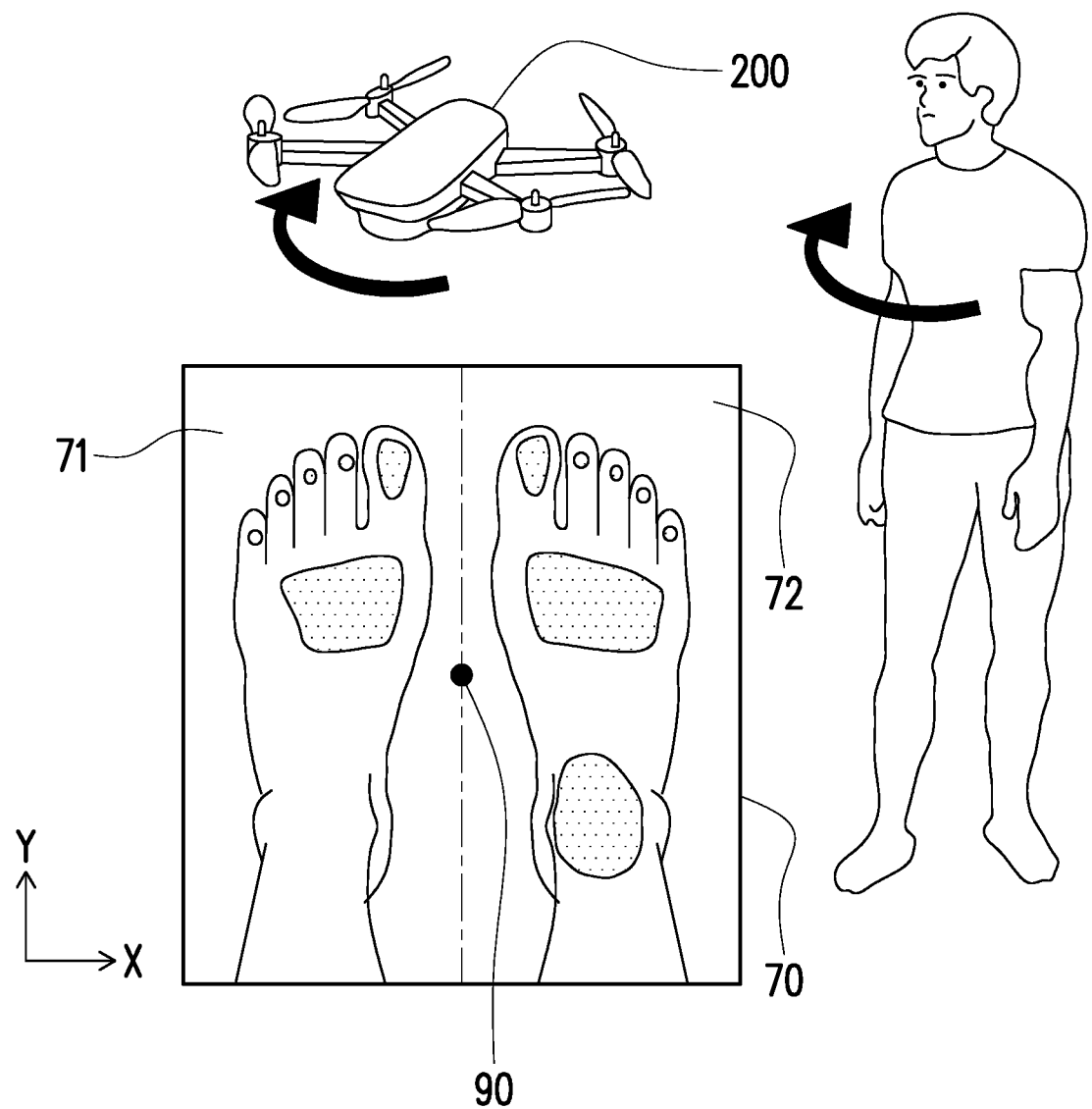
FIG. 14 is a schematic diagram of a drone yawing to the right according to an embodiment of the disclosure.

FIG. 13 is a schematic diagram of a drone 200 yawing to the left according to an embodiment of the disclosure. FIG. 14 is a schematic diagram of a drone yawing to the right according to an embodiment of the disclosure. Referring to FIG. 5 and FIG. 13 to FIG. 14, the processor 110 may divide the reference pressure distribution map 50 into the reference pressure distribution 51 and the reference pressure distribution 52, and may divide the current pressure distribution map 70 into the current pressure distribution 71 and the current pressure distribution 72. For example, assuming that the user faces the Y direction and the reference centroid 60 is the origin of the XY plane, the processor 110 may divide the reference pressure distribution map 50 into the reference pressure distribution 51 and the reference pressure distribution 52 according to the reference centroid 60. The reference pressure distribution 51 is the portion of the reference pressure distribution map 50 where the X value is negative and corresponds to the left foot of the user, and the reference pressure distribution 52 is the portion of the reference pressure distribution map 50 where the X value is positive and corresponds to the right foot of the user.

On the other hand, assuming that the user faces the Y direction and the current centroid 90 is the origin of the XY plane, the processor 110 may divide the current pressure distribution map 70 into the current pressure distribution 71 and the current pressure distribution 72 according to the current centroid 90. The current pressure distribution 71 is the portion of the current pressure distribution map 70 where the X value is negative and corresponds to the left foot of the user, and the current pressure distribution 72 is the portion of the current pressure distribution map 70 where the X value is positive and corresponds to the right foot of the user.

The processor 110 may calculate a first area difference between the reference pressure distribution 51 and the current pressure distribution 71 and calculate a second area difference between the reference pressure distribution 52 and the current pressure distribution 72. The processor 110 may control the yaw of the drone 200 according to the first area difference and the second area difference. Specifically, when upper body of the user turns to the left, the centroid of the user is biased to the left, resulting in an increase in the area of the current pressure distribution 71 and a decrease in the area of the current pressure distribution 72. Accordingly, the first area difference between the reference pressure distribution 51 and the current pressure distribution 71 decreases, and the second area difference between the reference pressure distribution 52 and the current pressure distribution 72 increases. Therefore, the processor 110 may control the drone 200 to yaw to the left in response to the first area difference being less than or equal to the threshold value and the second area difference being greater than the threshold value, as shown in FIG. 13.

On the other hand, when upper body of the user turns to the right, the centroid of the user is biased to the right, resulting in a decrease in the area of the current pressure distribution 71 and an increase in the area of the current pressure distribution 72. Accordingly, the first area difference between the reference pressure distribution 51 and the current pressure distribution 71 increases, and the second area difference between the reference pressure distribution 52 and the current pressure distribution 72 decreases. Therefore, the processor 110 may control the drone 200 to yaw to the right in response to the first area difference being greater than the threshold value and the second area difference being less than or equal to the threshold value, as shown in FIG. 14.

Figure 15:
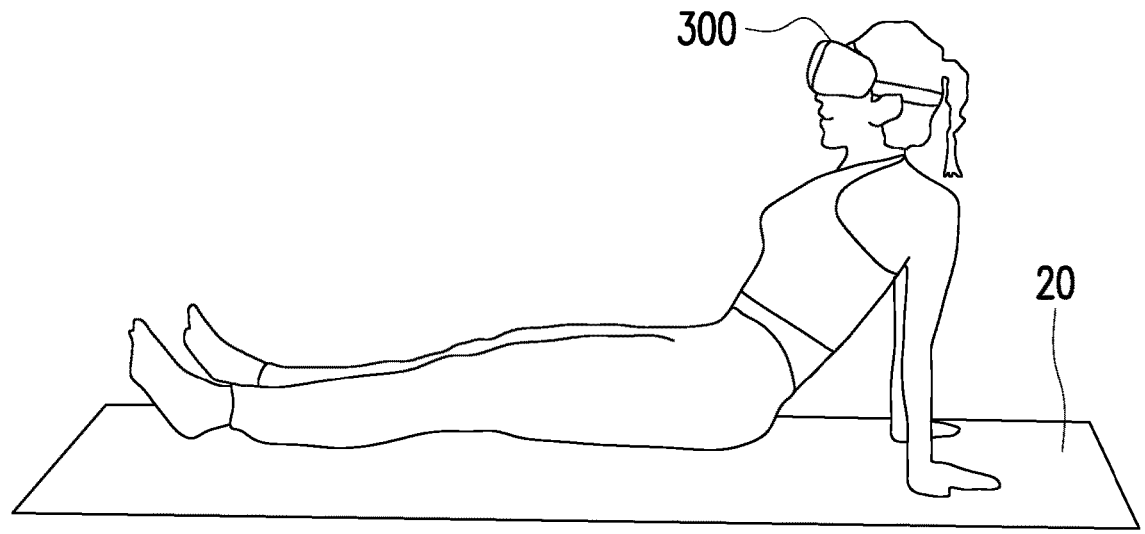
FIG. 15 and FIG. 16 are schematic diagrams of a user maintaining a sitting posture on a bearing surface according to an embodiment of the disclosure.
Figure 16:
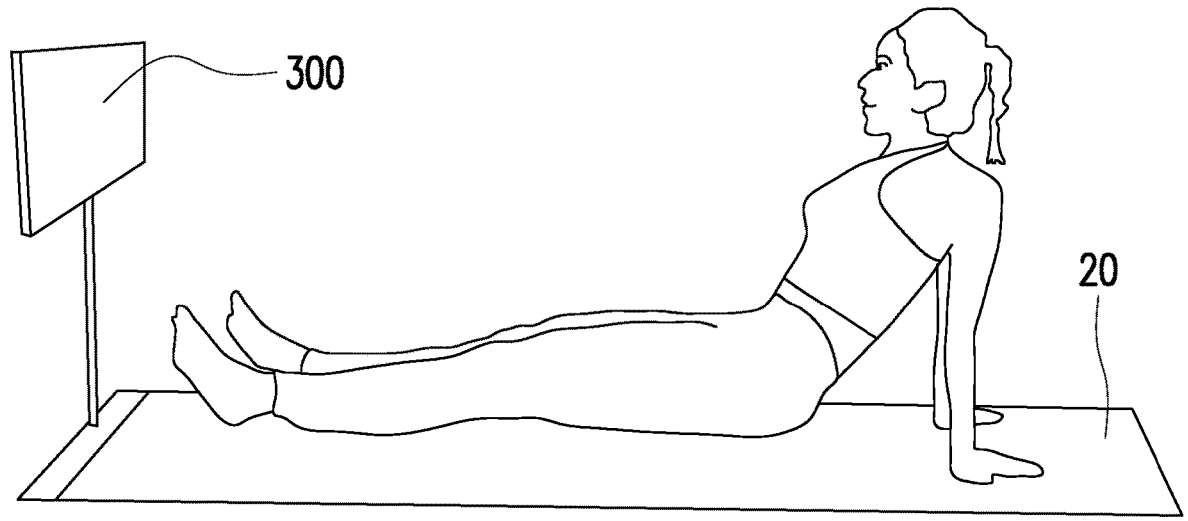

In an embodiment, the user may maintain a sitting posture on the bearing surface 20 to control the drone 200. FIG. 15 and FIG. 16 are schematic diagrams of a user maintaining a sitting posture on a bearing surface 20 according to an embodiment of the disclosure. FIG. 15 corresponds to a situation where the display device 300 is a head mounted display, and FIG. 16 corresponds to a situation where the display device 300 is a non-head mounted display.

Figure 17:
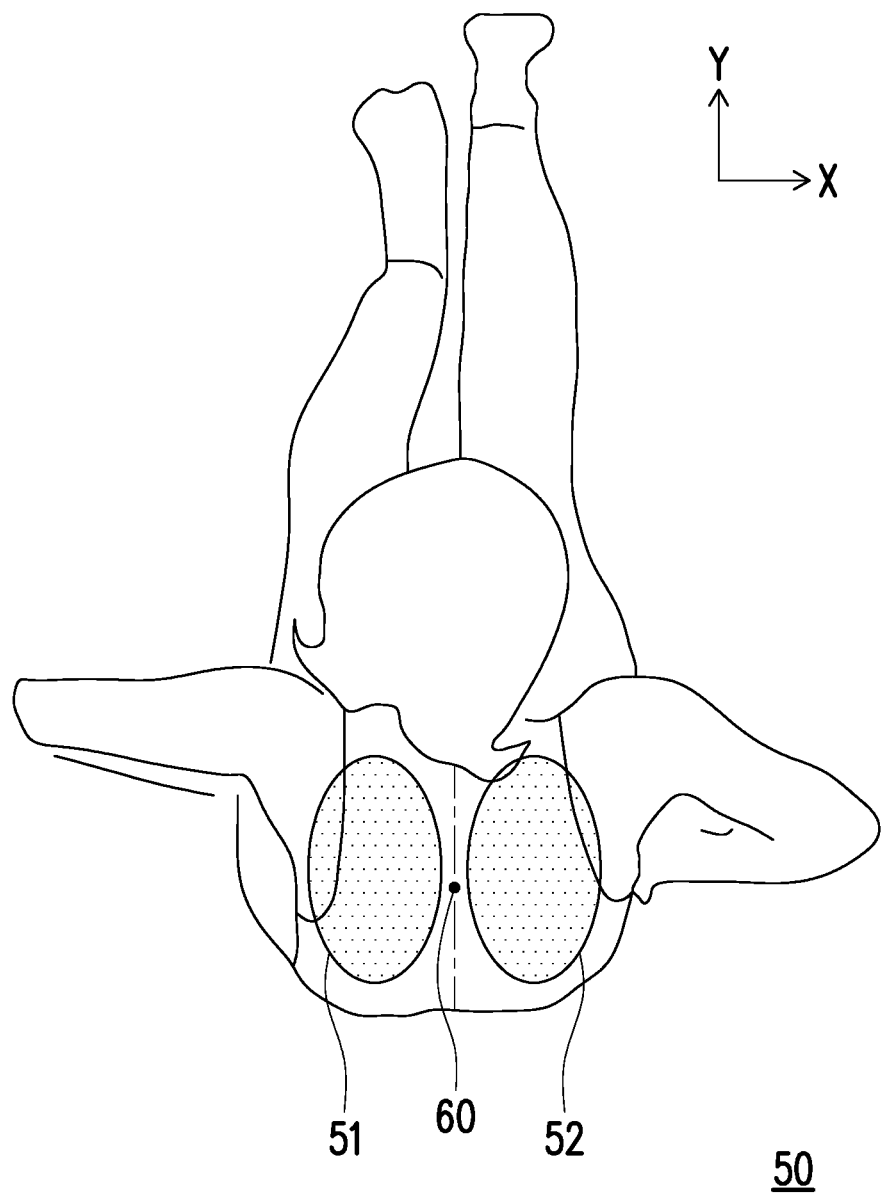
FIG. 17 is a schematic diagram of a reference pressure distribution map and a reference centroid corresponding to a sitting posture according to an embodiment of the disclosure.

FIG. 17 is a schematic diagram of a reference pressure distribution map 50 and a reference centroid 60 corresponding to a sitting posture according to an embodiment of the disclosure. The processor 110 may include a calibration mode. Before the processor 110 controls the flight of the drone 200, the processor 110 may first enter the calibration mode. When the processor 110 is in the calibration mode, the user may maintain a normal sitting posture on the bearing surface 20. At this time, the processor 110 may obtain the reference pressure distribution map 50 of the hip and the reference pressure sensing value of the palm via the pressure sensor 140 installed under the bearing surface 20. Taking FIG. 18 as an example, a sensing region of the pressure sensor 140 may be used to measure the pressure (i.e., the pressure exerted by the hip of the users on the bearing surface 20) on the position 21 of the bearing surface 20 (i.e., corresponding to the position of the hip of the user). Another sensing region of the pressure sensor 140 may be used to measure the pressure (i.e., the pressure exerted by the palm of the user on the bearing surface 20) on the position 22 of the bearing surface 20 (i.e., corresponding to the position of the palm of the user).

Next, the processor 110 may input the reference pressure distribution map 50 to the machine learning model 121, and then the machine learning model 121 outputs the reference centroid 60 corresponding to the reference pressure distribution map 50, in which the reference centroid 60 represents the centroid position of the user who maintains a normal sitting posture on the bearing surface 20.

Figure 18:
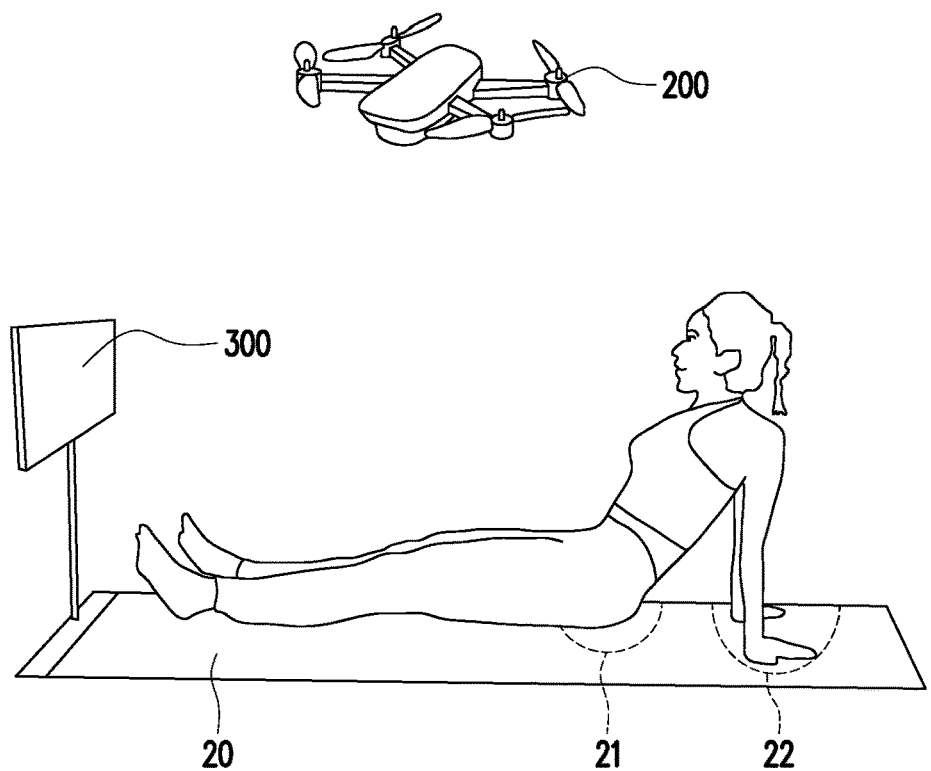
FIG. 18 is a schematic diagram of a drone hovering in the air according to an embodiment of the disclosure.
Figure 25:
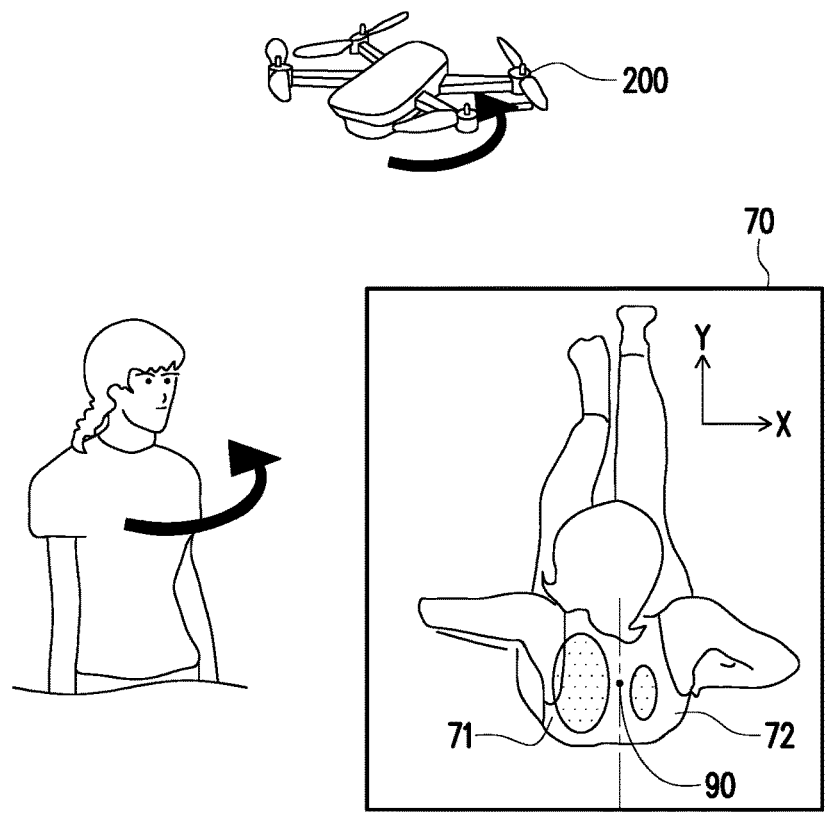
FIG. 25 is a schematic diagram of a drone yawing to the left according to an embodiment of the disclosure.
Figure 26:
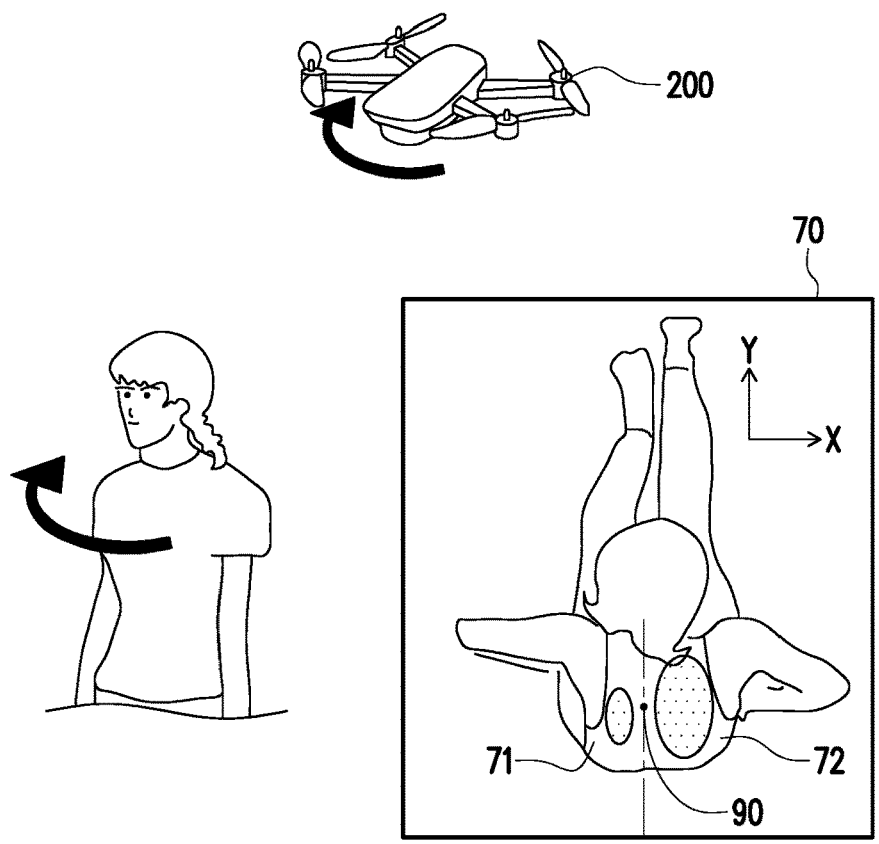
FIG. 26 is a schematic diagram of a drone yawing to the right according to an embodiment of the disclosure.

After obtaining the reference pressure distribution map 50, the reference centroid 60, and the reference pressure sensing value corresponding to the normal sitting posture of the user, the processor 110 may measure the pressure distribution map (i.e., the current pressure distribution map 70, as shown in FIG. 25 or FIG. 26) caused by the pressure currently exerted on the bearing surface 20 by the hip of the user via the pressure sensor 140. The processor 110 may input the current pressure distribution map 70 to the machine learning model 121 to obtain the current centroid (i.e., the current centroid 90, as shown in FIG. 25 or FIG. 26) on the bearing surface 20. The processor 110 may control the flight of the drone 200 according to the reference pressure distribution map 50, the reference centroid 60, the current pressure distribution map 70, and the current centroid 90. If the processor 110 determines that the current pressure distribution map 70 or the current centroid 90 is insufficient to control the movement of the drone 200, the processor 110 may control the drone 200 to maintain hovering, as shown in FIG. 18.

In an embodiment, the processor 110 may further measure the current pressure sensing value currently exerted by the palm of the user on the position 22 of the bearing surface 20 via the pressure sensor 140. The processor 110 may control the flight of the drone 200 according to the reference pressure distribution map 50, the reference centroid 60, the current pressure distribution map 70, the current centroid 90, the reference pressure sensing value, and the current pressure sensing value. If the processor 110 determines that the current pressure distribution map 70, the current centroid 90, or the current pressure sensing value is insufficient to control the movement of the drone 200, the processor 110 may control the drone 200 to maintain hovering.

In an embodiment, the processor 110 may calculate the area difference between the reference pressure distribution map 50 and the current pressure distribution map 70, and control the drone 200 to move vertically according to the area difference. If the area difference is positive, the processor 110 may control the drone 200 to move vertically upward. If the area difference is negative, the processor 110 may control the drone 200 to move vertically downward. On the other hand, the processor 110 may calculate a pressure difference between the reference pressure sensing value and the current pressure sensing value, and control the drone 200 to move vertically according to the pressure difference. If the pressure difference is negative, the processor 110 may control the drone 200 to move vertically upward. If the pressure difference is positive, the processor 110 may control the drone 200 to move vertically downward. The processor 110 may control the drone 200 to move vertically according to at least one of the area difference or the pressure difference.

Figure 19:
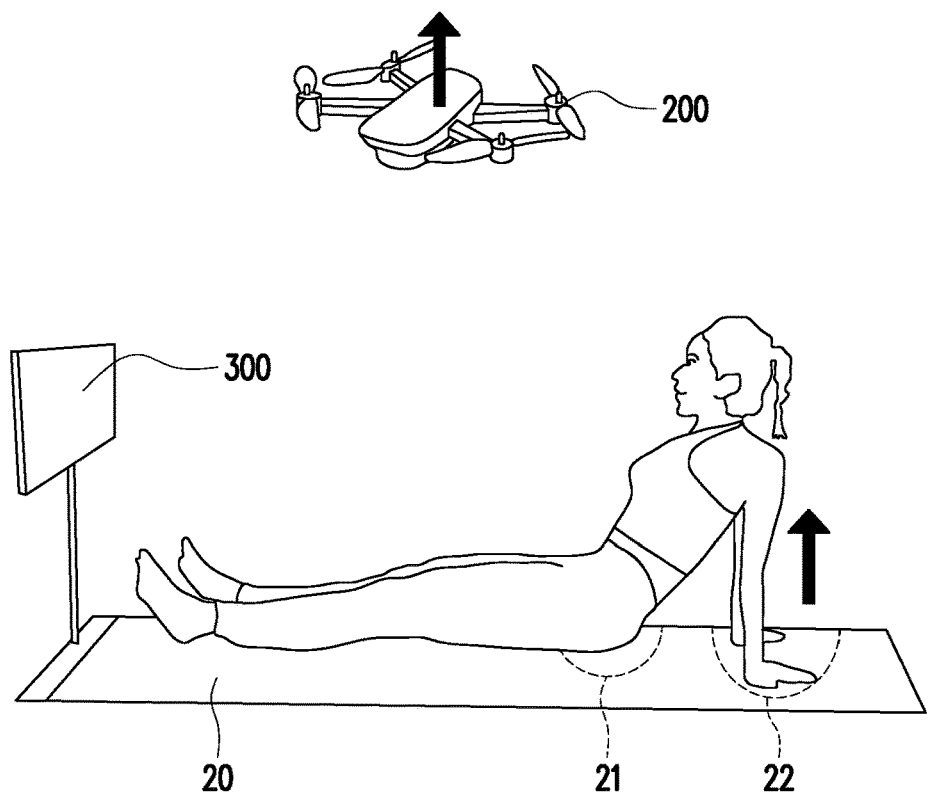
FIG. 19 is a schematic diagram of a drone moving vertically upward according to an embodiment of the disclosure.

FIG. 19 is a schematic diagram of a drone 200 moving vertically upward according to an embodiment of the disclosure. The processor 110 may control the drone 200 to move vertically upward when the user maintaining the sitting posture props up the body. When the user props up the body, the contact area between the hip of the user and the bearing surface 20 is decreased, and the area of the current pressure distribution map 70 is less than the reference pressure distribution map 50. Accordingly, the processor 110 may control the drone 200 to move vertically upward in response to the area difference between the reference pressure distribution map 50 and the current pressure distribution map 70 being positive. On the other hand, when the user props up the body, the palm of the user exerts force on the position 22 of the bearing surface 20, resulting in an increase in the current pressure sensing value, and the current pressure sensing value is greater than the reference pressure sensing value. Accordingly, the processor 110 may control the drone 200 to move vertically upward in response to the negative pressure difference between the reference pressure sensing value and the current pressure sensing value.

Figure 20:
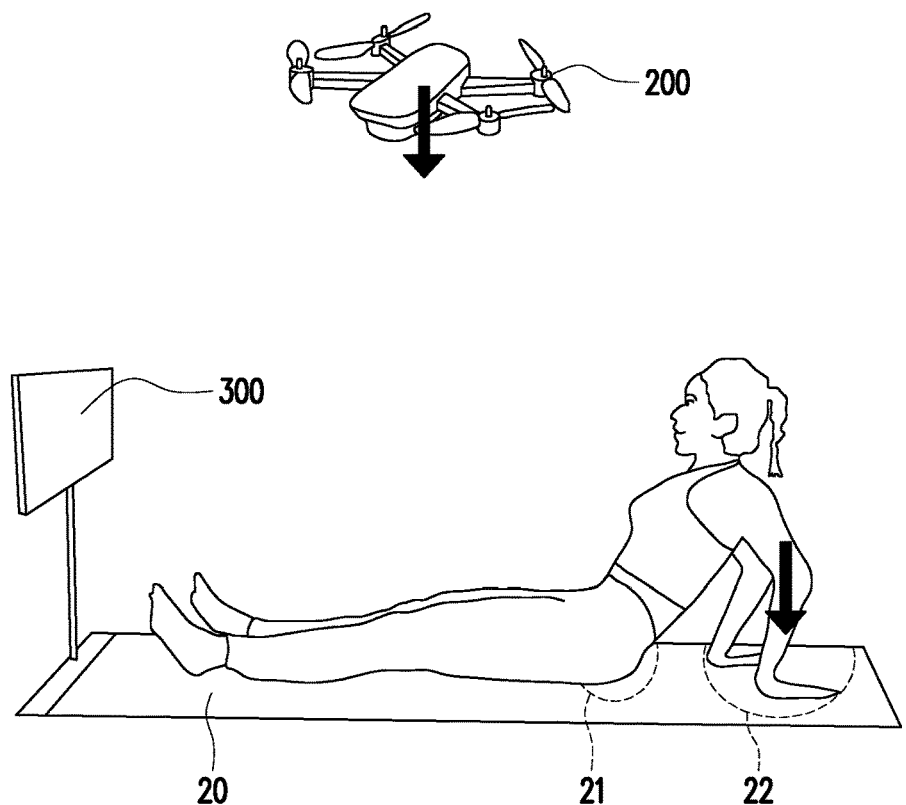
FIG. 20 is a schematic diagram of a drone moving vertically downward according to an embodiment of the disclosure.

FIG. 20 is a schematic diagram of a drone moving vertically downward according to an embodiment of the disclosure. The processor 110 may control the drone 200 to move vertically downward when the user maintaining the sitting posture relaxes the body. When the user relaxes the body, the contact area between the hip of the user and the bearing surface 20 is increased, and the area of the current pressure distribution map 70 is greater than the reference pressure distribution map 50. Accordingly, the processor 110 may control the drone 200 to move vertically downward in response to the area difference between the reference pressure distribution map 50 and the current pressure distribution map 70 being negative. On the other hand, when the user relaxes the body, the force exerted by the palm of the user on the position 22 of the bearing surface 20 decreases, resulting in a decrease in the current pressure sensing value, and the current pressure sensing value is less than the reference pressure sensing value. Accordingly, the processor 110 may control the drone 200 to move vertically downward in response to the positive pressure difference between the reference pressure sensing value and the current pressure sensing value.

In an embodiment, the processor 110 may control the drone 200 to stop moving vertically in response to the area difference changing from positive to negative or from negative to positive when the drone 200 moves vertically, or in response to the pressure difference changing from negative to positive or from positive to negative when the drone 200 moves vertically. Specifically, the user may prop up the body to control the drone 200 to move vertically upward. When the user changes from the propped up posture to the normal sitting posture, the contact area between the hip of the user and the bearing surface 20 is increased instantly, thereby the area difference between the reference pressure distribution map 50 and the current pressure distribution map 70 is changed from positive to negative. The force exerted by the palm of the user on the position 22 of the bearing surface 20 is decreased instantly, thereby the pressure difference between the reference pressure sensing value and the current pressure sensing value changes from negative to positive. Accordingly, the processor 110 may control the drone 200 to stop moving vertically.

On the other hand, the user may relax the body to control the drone 200 to move vertically downward. When the user changes from the relaxed posture to the normal sitting posture, the contact area between the hip of the user and the bearing surface 20 is decreased instantly, thereby the area difference between the reference pressure distribution map 50 and the current pressure distribution map 70 is changed from negative to positive. The force exerted by the palm of the user on the position 22 of the bearing surface 20 is increased instantly, thereby the pressure difference between the reference pressure sensing value and the current pressure sensing value changes from positive to negative. Accordingly, the processor 110 may control the drone 200 to stop moving vertically.

In an embodiment, the processor 110 may decide whether to control the drone 200 to stop moving vertically downward according to the altitude measured by the sensor 270 of the drone 200. Specifically, the drone 200 may receive a signal from the processor 110 (i.e., a signal instructing the drone 200 to move vertically downward) to move vertically downward. During the period when the drone 200 receives the signal and moves vertically downward, in response to the altitude being less than the threshold value, the processor 210 of the drone 200 may control the motor module 280 to stop the drone 200 from moving vertically downward. Accordingly, the crash of the drone 200 due to improper operation by the user may be avoided.

In an embodiment, when the drone 200 stops moving vertically downward, the processor 210 of the drone 200 may land in response to continuously receiving signals (i.e., signals instructing the drone 200 to move vertically downward) from the system 10. In other words, when the user relaxes the body so that the drone 200 descends to a lowest altitude, the user may continuously maintain the relaxed posture to control the drone 200 to land.

In an embodiment, the processor 110 may calculate a vector from the reference centroid 60 to the current centroid 90 (as shown in FIG. 25 and FIG. 26), and control the horizontal movement of the drone 200 according to the vector. The moving velocity of the drone 200 may be proportional to the magnitude of the vector, and the moving direction of the drone 200 may be the same as the direction of the vector. The greater the magnitude of the vector from the reference centroid 60 to the current centroid 90, the faster the flight velocity of the drone 200. The smaller the magnitude of the vector from the reference centroid 60 to the current centroid 90, the smaller the flight velocity of the drone 200.

Figure 21:
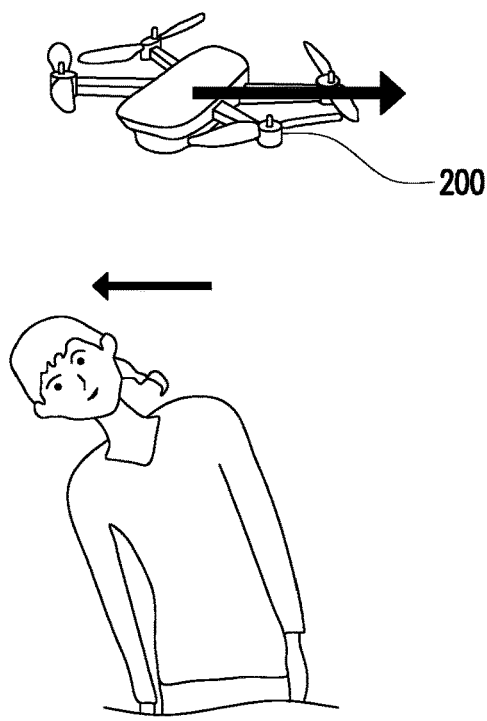
FIG. 21 is a schematic diagram of a drone moving horizontally to the right according to an embodiment of the disclosure.

FIG. 21 is a schematic diagram of a drone 200 moving horizontally to the right according to an embodiment of the disclosure. When the body of the user tilts to the right, the vector V between the reference centroid 60 and the current centroid 90 points to the right. Accordingly, the processor 110 may control the drone 200 to fly parallel to the right.

Figure 22:
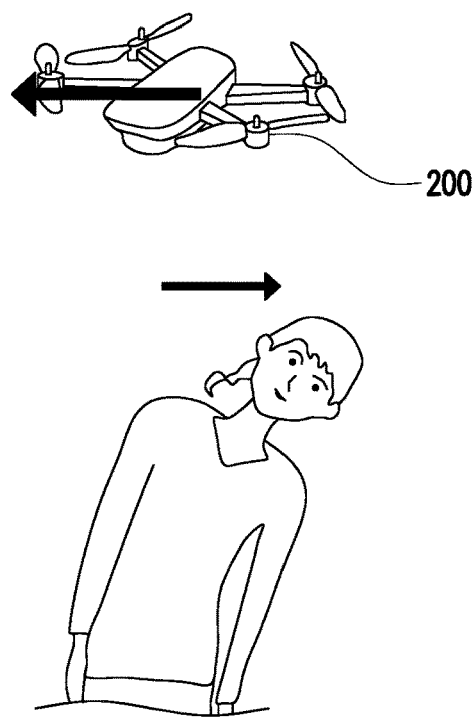
FIG. 22 is a schematic diagram of a drone moving horizontally to the left according to an embodiment of the disclosure.

FIG. 22 is a schematic diagram of a drone 200 moving horizontally to the left according to an embodiment of the disclosure. When the body of the user tilts to the left, the vector V between the reference centroid 60 and the current centroid 90 points to the left. Accordingly, the processor 110 may control the drone 200 to fly parallel to the left.

Figure 23:
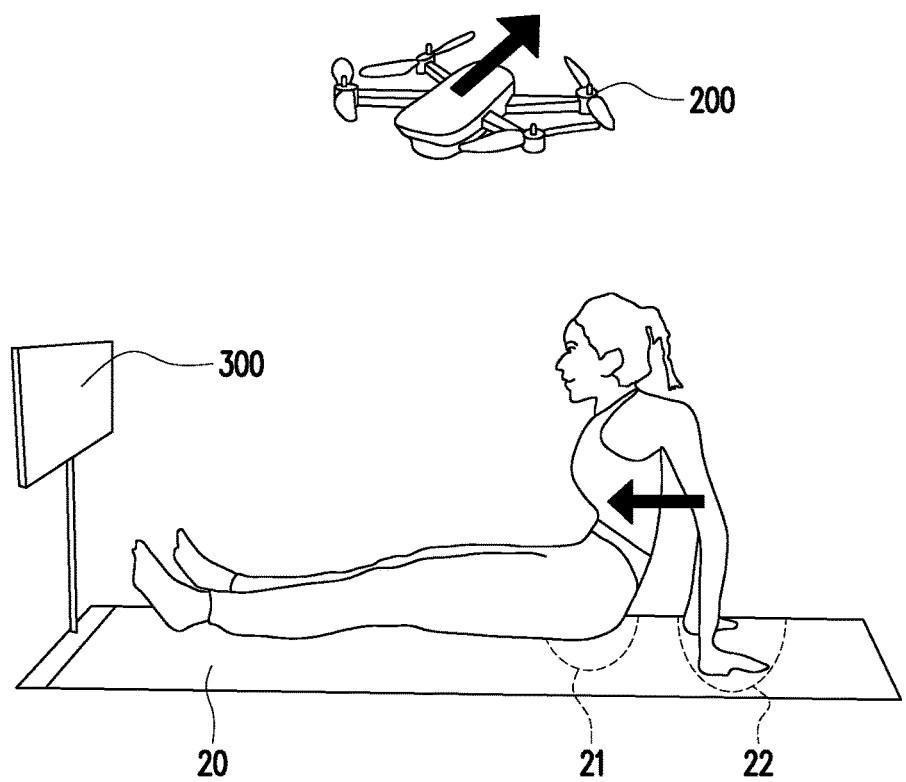
FIG. 23 is a schematic diagram of a drone moving horizontally forward according to an embodiment of the disclosure.

FIG. 23 is a schematic diagram of a drone 200 moving horizontally forward according to an embodiment of the disclosure. When the body of the user tilts forward, the vector V between the reference centroid 60 and the current centroid 90 points forward. Accordingly, the processor 110 may control the drone 200 to fly forward in parallel.

Figure 24:
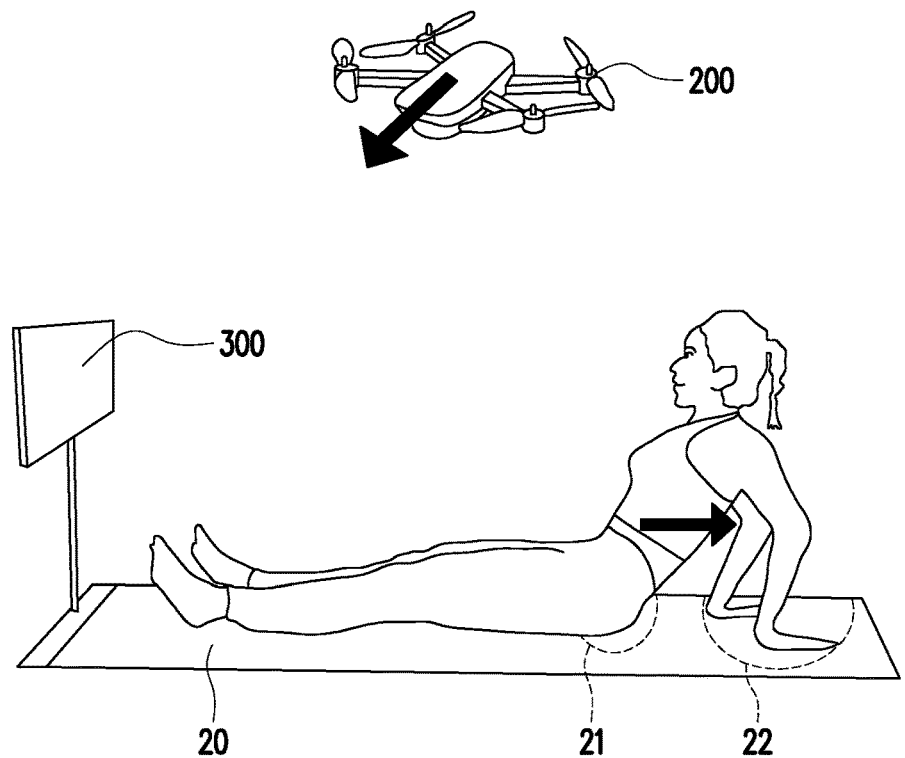
FIG. 24 is a schematic diagram of a drone moving horizontally backward according to an embodiment of the disclosure.

FIG. 24 is a schematic diagram of a drone 200 moving horizontally backward according to an embodiment of the disclosure. When the body of the user tilts backward, the vector V between the reference centroid 60 and the current centroid 90 points backward. Accordingly, the processor 110 may control the drone 200 to fly backward in parallel.

In an embodiment, the processor 110 may control the drone 200 to stop moving horizontally in response to the magnitude |V| of the vector V between the reference centroid 60 and the current centroid 90 decreasing to less than a threshold value when the drone 200 moves horizontally. Specifically, when the user tilts the body, the drone 200 may continuously receive signals from the processor 110 to move horizontally. The magnitude |V| of the vector V decreases as the body of the use transitions from a tilted posture to a normal sitting posture. The processor 110 may determine that the user has returned to a normal sitting posture when the magnitude |V| of the vector V is decreased to less than the threshold value. Accordingly, the processor 110 may control the drone 200 to stop moving horizontally.

In an embodiment, the processor 110 may control the yaw of the drone 200 according to the rotation direction of the upper body of the user. If the upper body of the user turns to the left, the processor 110 may control the drone 200 to yaw to the left. If the upper body of the user turns to the right, the processor 110 may control the drone 200 to yaw to the right.

FIG. 25 is a schematic diagram of a drone yawing to the left according to an embodiment of the disclosure. FIG. 26 is a schematic diagram of a drone yawing to the right according to an embodiment of the disclosure. Referring to FIG. 17 and FIG. 25 to FIG. 26, the processor 110 may divide the reference pressure distribution map 50 into the reference pressure distribution 51 and the reference pressure distribution 52, and may divide the current pressure distribution map 70 into the current pressure distribution 71 and the current pressure distribution 72. For example, assuming that the user faces the Y direction and the reference centroid 60 is the origin of the XY plane, the processor 110 may divide the reference pressure distribution map 50 into the reference pressure distribution 51 and the reference pressure distribution 52 according to the reference centroid 60. The reference pressure distribution 51 is the portion of the reference pressure distribution map 50 where the X value is negative and corresponds to the left hip of the user, and the reference pressure distribution 52 is the portion of the reference pressure distribution map 50 where the X value is positive and corresponds to the right hip of the user.

On the other hand, assuming that the user faces the Y direction and the current centroid 90 is the origin of the XY plane, the processor 110 can divide the current pressure distribution map 70 into the current pressure distribution 71 and the current pressure distribution 72 according to the current centroid 90. The current pressure distribution 71 is the portion of the current pressure distribution map 70 where the X value is negative and corresponds to the left hip of the user, and the current pressure distribution 72 is the portion of the current pressure distribution map 70 where the X value is positive and corresponds to the right hip of the user.

The processor 110 may calculate a first area difference between the reference pressure distribution 51 and the current pressure distribution 71 and calculate a second area difference between the reference pressure distribution 52 and the current pressure distribution 72. The processor 110 may control the yaw of the drone 200 according to the first area difference and the second area difference. Specifically, when upper body of the user turns to the left, the centroid of the user is biased to the left, resulting in an increase in the area of the current pressure distribution 71 and a decrease in the area of the current pressure distribution 72. Accordingly, the first area difference between the reference pressure distribution 51 and the current pressure distribution 71 decreases, and the second area difference between the reference pressure distribution 52 and the current pressure distribution 72 increases. Therefore, the processor 110 may control the drone 200 to yaw to the left in response to the first area difference being less than or equal to the threshold value and the second area difference being greater than the threshold value, as shown in FIG. 25.

On the other hand, when upper body of the user turns to the right, the centroid of the user is biased to the right, resulting in a decrease in the area of the current pressure distribution 71 and an increase in the area of the current pressure distribution 72. Accordingly, the first area difference between the reference pressure distribution 51 and the current pressure distribution 71 increases, and the second area difference between the reference pressure distribution 52 and the current pressure distribution 72 decreases. Therefore, the processor 110 may control the drone 200 to yaw to the right in response to the first area difference being greater than the threshold value and the second area difference being less than or equal to the threshold value, as shown in FIG. 26.

Figure 27:
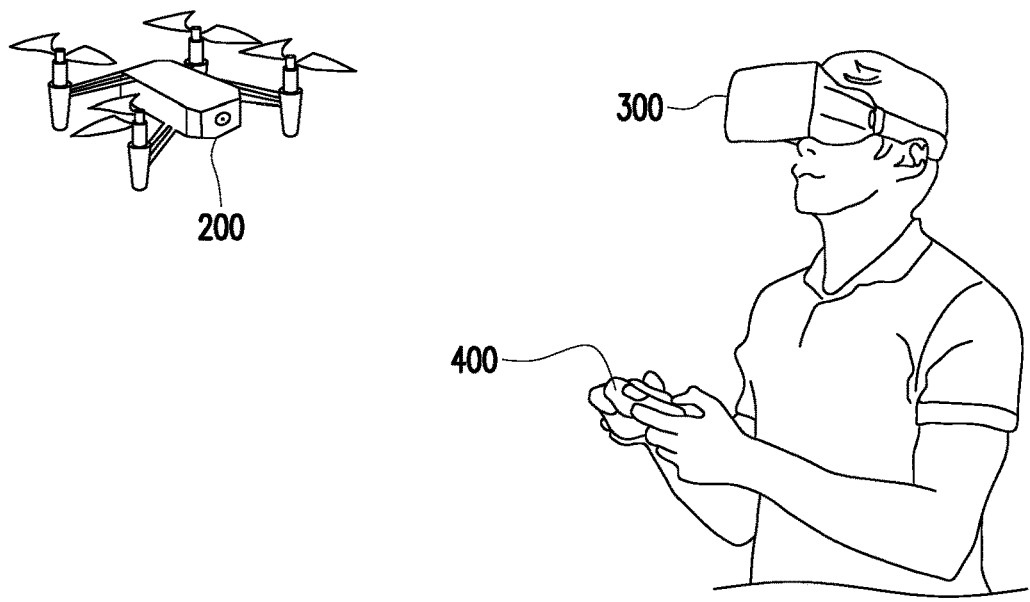
FIG. 27 is a schematic diagram of a user experiencing a mixed reality scene according to an embodiment of the disclosure.

The user of the system 10 cannot only control the flight of the drone 200 by using motion sensing, but also interact with the mixed reality scene provided by the display device 300 via operating the remote controller 400. FIG. 27 is a schematic diagram of a user experiencing a mixed reality scene according to an embodiment of the disclosure, in which the display device 300 is a head mounted display. The drone 200 can obtain images through the image capturing device 260 and transmit the images to the display device 300. The display device 300 can actively create a mixed reality scene associated with the image for the user according to the image from the drone 200, or present an image with a mixed reality scene in combination with the signal provided by the game server. The user can operate the remote controller 400 to transmit a signal to the display device 300 to interact with the mixed reality scene. For example, the display device 300 can create a mixed reality scene of a first-person shooter (FPS) game according to the image of the drone 200. The user can operate the remote controller 400 to control the drone 200 to fire/shoot in the mixed reality scene.

The user can also interact with the mixed reality scene via performing certain actions on the bearing surface 20. In an embodiment, the user may step on any position on the bearing surface 20, or may limit stepping to a specific region (e.g., the position 21 of the bearing surface 20). The processor 110 can determine whether a stepping behavior occurs on the bearing surface 20 via the pressure sensor 140. Specifically, taking the stepping behavior of the left foot of the user as an example, the processor 110 can determine whether the left foot of the user completely leaves the bearing surface 20 according to the change of the current pressure distribution 71 (i.e., the area of the current pressure distribution 71 is decreased to zero), and steps back on the bearing surface 20 again (i.e., the area of the current pressure distribution 71 is increased, or changed from zero to positive). If the processor 110 determines that the left foot of the user completely leaves the bearing surface 20 and steps back on the bearing surface 20 again, the processor 110 determines that a stepping behavior occurs on the bearing surface 20. If a stepping behavior occurs on the bearing surface 20, the processor 110 may transmit a signal to the display device 300, in which the signal is used to interact with the mixed reality scene.

In an embodiment, the user can tap the bearing surface 20 (e.g., the position 22 of the bearing surface 20) with a finger. The processor 110 determines whether a tapping behavior occurs on the bearing surface 20 via the pressure sensor 140. Specifically, the processor 110 may determine whether the tapping behavior occurs according to the current pressure sensing value detected by the pressure sensor 140 at the position 22 of the bearing surface 20. The processor 110 can determine whether a certain finger of the user has completely left the bearing surface 20 according to the change of the current pressure sensing value (i.e., the pressure sensing value of the current certain finger returns to zero), and returns back on the bearing surface 20 (i.e., the current pressure sensing value of the certain finger is increased, or is changed from zero to positive). If the processor 110 determines that a certain finger of the user completely leaves the bearing surface 20 and returns back on the bearing surface 20 again, the processor 110 determines that a tapping behavior occurs on the bearing surface 20. If a tapping behavior occurs on the bearing surface 20, the processor 110 may transmit a signal to the display device 300, in which the signal is used to interact with the mixed reality scene.

Figure 28:
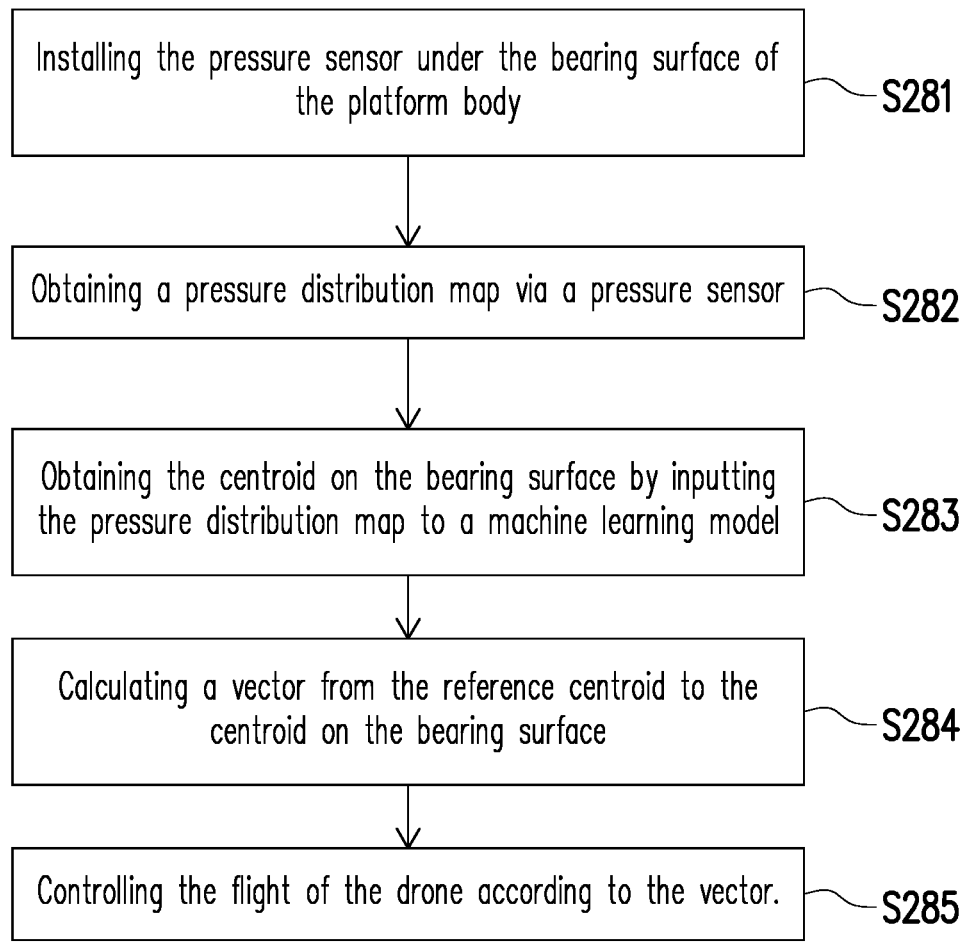
FIG. 28 is a flowchart of a method of controlling a drone based on pressure according to an embodiment of the disclosure.

FIG. 28 is a flowchart of a method of controlling a drone based on pressure according to an embodiment of the disclosure, in which the method can be implemented by the system 10 shown in FIG. 1. In step S281, the pressure sensor is installed under the bearing surface of the platform body. In step S282, a pressure distribution map is obtained via a pressure sensor. In step S283, the pressure distribution map is input into a machine learning model to obtain the centroid on the bearing surface. In step S284, a vector from the reference centroid to the centroid on the bearing surface is calculated. In step S285, the flight of the drone is controlled according to the vector.

To sum up, the system of the disclosure can sense the pressure caused by the user via the bearing surface of the platform body, and can sense the acceleration or angular velocity of the user via the handrail of the platform body. On the bearing surface, the user can maintain a standing or sitting posture. The pressure on the bearing surface can be converted into a pressure distribution map. Based on the machine learning model, the system can determine the centroid of the user according to parameters such as the pressure distribution map, acceleration, or angular velocity. The system can control the drone to translate, pitch, or yaw based on changes in the pressure distribution map or the movement of the centroid. The system of the disclosure may further include a display device or a remote control to provide the user with a gaming experience combining the drone technology and the mixed reality technology.

What is claimed is:

1. A system of controlling a drone based on pressure, comprising:
   a transceiver, communicatively connected to the drone;
   a storage medium, storing a machine learning model;
   a platform body, comprising a bearing surface;
   a pressure sensor, installed under the bearing surface; and
   a processor, coupled to the storage medium, the transceiver, and the pressure sensor, wherein the processor is configured to:
   obtain a pressure distribution map via the pressure sensor;
   obtain a centroid on the bearing surface by inputting the pressure distribution map into the machine learning model;
   calculate a vector from a reference centroid to the centroid on the bearing surface; control a flight of the drone according to the vector;
   calculate an area difference between a reference pressure distribution map and the pressure distribution map based on changes in contact area on the bearing surface between the reference pressure distribution map and the pressure distribution map; and
   control the drone to move vertically according to the area difference.

2. The system according to claim 1, wherein the processor is further configured to:
   control the drone to move horizontally according to the vector.

3. The system according to claim 2, wherein the processor is further configured to:
   in response to a magnitude of the vector decreasing to less than a threshold value while the drone is moving horizontally, control the drone to stop moving horizontally.

4. The system according to claim 1, wherein the processor comprises a calibration mode, wherein the processor in the calibration mode is configured to:
   obtain the reference pressure distribution map via the pressure sensor; and
   obtain the reference centroid by inputting the reference pressure distribution map into the machine learning model.

5. The system according to claim 1, wherein the processor is further configured to:
   in response to the area difference being positive, control the drone to move vertically upward; and
   in response to the area difference being negative, control the drone to move vertically downward.

6. The system according to claim 1, wherein the processor is further configured to:
   in response to the area difference changing from positive to negative or from negative to positive when the drone moves vertically, control the drone to stop moving vertically.

7. The system according to claim 1, wherein the processor is further configured to:
   obtain the reference pressure distribution map, wherein the reference pressure distribution map comprises a first reference pressure distribution and a second reference pressure distribution, wherein the pressure distribution map comprises a first pressure distribution and a second pressure distribution;
   calculate a first area difference between the first reference pressure distribution and the first pressure distribution, and calculate a second area difference between the second reference pressure distribution and the second pressure distribution; and
   control a yaw of the drone according to the first area difference and the second area difference.

8. The system according to claim 7, wherein the processor is further configured to:
   in response to the first area difference being greater than a threshold value and the second area difference being less than or equal to the threshold value, control the drone to yaw in a first direction.

9. The system according to claim 1, wherein
   the pressure sensor comprises a first region and a second region, wherein the first region and the second region are not connected, wherein the processor is further configured to:
   obtain a pressure sensing value via the second region of the pressure sensor;
   calculate a pressure difference between a reference pressure sensing value and the pressure sensing value; and
   control the drone to move vertically according to the pressure difference.

10. The system according to claim 9, wherein the first region is used to measure a pressure exerted by a hip of a user on the bearing surface, wherein the second region is used to measure a pressure exerted by a palm of the user on the bearing surface.

11. The system according to claim 9, wherein the processor is further configured to:
    in response to the pressure difference being negative, control the drone to move vertically upward; and
    in response to the pressure difference being positive, control the drone to move vertically downward.

12. The system according to claim 9, wherein the processor is further configured to:
in response to the pressure difference changing from positive to negative or from negative to positive when the drone moves vertically, control the drone to stop moving vertically.

13. The system according to claim 1, wherein the platform body further comprises a handrail, wherein the system further comprises:
an accelerometer, installed in the handrail and coupled to the processor; and
a gyroscope, installed in the handrail and coupled to the processor.

14. The system according to claim 13, wherein the processor is further configured to:
obtain acceleration via the accelerometer;
obtain angular velocity via the gyroscope; and
obtain the centroid on the bearing surface by inputting the pressure distribution map, the acceleration, and the angular velocity into the machine learning model.

15. The system according to claim 1, further comprising:
a display device, communicatively connected to an image capturing device of the drone, wherein the display device displays an image provided by the image capturing device.

16. The system according to claim 15, wherein the display device comprises
a head mounted display, receiving a first signal to provide a mixed reality scene associated with the image according to the first signal.

17. The system according to claim 16, further comprising:
a remote control, communicatively connected to the head mounted display, wherein the remote control transmits a second signal to the head mounted display.

18. The system according to claim 16, wherein the head mounted display is communicatively connected to the processor, wherein the processor is further configured to:
determine whether a stepping behavior occurs on the bearing surface via the pressure sensor; and
in response to the stepping behavior, transmit a second signal to the head mounted display.

19. The system according to claim 1, further comprising:
the drone, comprising an altitude sensor, wherein the altitude sensor obtains an altitude, wherein the drone receives a second signal from the processor, and moves vertically downward according to the second signal, wherein
in response to the altitude being less than a threshold value, the drone stops moving vertically downward.

20. The system according to claim 19, wherein
when the drone stops moving vertically downward, the drone lands in response to continuously receiving the second signal.

21. The system according to claim 1, wherein the machine learning model comprises a deep learning model.

22. A method of controlling a drone based on pressure, comprising:
installing a pressure sensor under a bearing surface of a platform body;
obtaining a pressure distribution map via the pressure sensor;
obtaining a centroid on the bearing surface by inputting the pressure distribution map into a machine learning model;
calculating a vector from a reference centroid to the centroid on the bearing surface;
controlling a flight of the drone according to the vector;
calculating an area difference between a reference pressure distribution map and the pressure distribution map based on changes in contact area on the bearing surface between the reference pressure distribution map and the pressure distribution map; and
controlling the drone to move vertically according to the area difference.

* * * * *